(12) United States Patent
Maim

(10) Patent No.: US 7,676,507 B2
(45) Date of Patent: Mar. 9, 2010

(54) METHODS AND SYSTEMS FOR SEARCHING AND ASSOCIATING INFORMATION RESOURCES SUCH AS WEB PAGES

(76) Inventor: Enrico Maim, 17 rue Biscornet, 75012 Paris (FR)

( * ) Notice: Subject to any disclaimer, the term of this patent is extended or adjusted under 35 U.S.C. 154(b) by 0 days.

(21) Appl. No.: 10/501,494

(22) PCT Filed: Jan. 13, 2003

(86) PCT No.: PCT/FR03/00089

§ 371 (c)(1),
(2), (4) Date: Mar. 18, 2005

(87) PCT Pub. No.: WO03/057648

PCT Pub. Date: Jul. 17, 2003

(65) Prior Publication Data

US 2005/0171946 A1    Aug. 4, 2005

(30) Foreign Application Priority Data

Jan. 11, 2002 (FR) .................................. 02 00341
May 7, 2002 (FR) .................................. 02 05751

(51) Int. Cl.
*G06F 12/00* (2006.01)
(52) U.S. Cl. .................................................... 707/204
(58) Field of Classification Search ................. 707/204, 707/5
See application file for complete search history.

(56) References Cited

U.S. PATENT DOCUMENTS

| | | | | |
|---|---|---|---|---|
| 5,870,770 A | * | 2/1999 | Wolfe | 715/805 |
| 6,658,623 B1 | * | 12/2003 | Schilit et al. | 715/208 |
| 6,832,218 B1 | * | 12/2004 | Emens et al. | 707/3 |
| 7,386,792 B1 | * | 6/2008 | Bascom et al. | 715/205 |
| 2002/0065673 A1 | * | 5/2002 | Rooke | 705/1 |
| 2002/0099685 A1 | * | 7/2002 | Takano et al. | 707/1 |
| 2003/0005002 A1 | * | 1/2003 | Chen et al. | 707/515 |
| 2003/0101286 A1 | * | 5/2003 | Kolluri et al. | 709/316 |

* cited by examiner

*Primary Examiner*—Wilson Lee
*Assistant Examiner*—Michael Le
(74) *Attorney, Agent, or Firm*—Blakely, Sokoloff, Taylor & Zafman LLP

(57) ABSTRACT

A method manages information resources in a computer system. The method includes receiving user information from an input device. The user information is representative of a declaration that a second resource accessible by the system should be associated with a first resource. The method further includes storing in association with the second resource an identifier of the first resource. The method identifies other resources that are relevant with respect to the second resource using a relevance scoring process. The method further determines whether the second resource with respect to other relevant resources has a first identifier associated herewith when one of the other resources is to be accessed by the system for display, and if it does, displays signaling information distinct from the display of the other resource itself signaling of the existence of the first resource.

16 Claims, 3 Drawing Sheets

METHODS AND SYSTEMS FOR SEARCHING AND ASSOCIATING INFORMATION RESOURCES SUCH AS WEB PAGES

The present invention relates in a general manner to methods and systems for managing resources such as web pages accessible via the Internet, or any other types of documents, aimed on the one hand at improving the obtaining of resources that are "close" to given resources, in terms in particular of centers of interest for the user, and aimed on the other hand at allowing the user, in a particularly simple and intuitive manner, to effect associations between resources himself, especially so as to benefit therefrom during the obtaining of close resources.

STATE OF THE ART

The quantity of information potentially relevant for each individual is becoming such that the present procedures for storing and searching for information are scarcely adequate. Alongside systems making it possible to retrieve information organized explicitly (such as "favorites") or by key words (via a search engine), it would be desirable to have available a method which spontaneously proposes context dependent relevant information.

Systems which provide relevant links (or rather "related links" to use the jargon) with respect to a current page visited on the web are known. Typically these systems comprise an extension to the Internet browser which communicates with a remote server which provides the relevant links as a function of the current page presented in the browser's main window. Typically these links are presented, in the form of a list of URLs, in a window adjacent to the browser's main window.

However, such systems are not extended to serve as associative memory.

SUMMARY OF THE INVENTION

An object of the present invention is to propose computer methods and systems for searching for resources (especially web pages, diverse computer documents) that are "close" to given resources (this notion of closeness being made explicit later), and methods for the associative management of resources.

In particular, the invention is aimed at characterizing information elements with respect to new pages which appear on the web, thus opening up the way to multiple new applications of dynamic management of content with respect to the user's browsing context.

More precisely, it is the aim of the invention that each information element be associated with links on relevant web pages which characterize it and which are automatically maintained up to date. It is thus possible to characterize nontexual information, such as photos, sounds and animations (in flash, etc.) and dynamically select the elements to be presented to the user as a function of the context of his browsing which is also characterized by sets of relevant web pages. This approach is suitable especially, but not exclusively, for magazines in the art of living, fashion and in all other areas of "taste" where it is difficult to characterize through key words the interest shown by the subscriber in an item of information (when for example it represents a piece of music, a piece of art, a culinary dish, etc).

Another object of the invention is to associate other targeted elements, such as targeted advertisements, with information elements, in exchange for an innovative associative memory service offered to surfers.

In particular, the aim is that, typically by means of an extension of their browser (extension downloadable from a given website), users can use the information elements of this site as "associative memory". Thus, during the user's browsing, the most relevant element of the site with respect to the web page visited—as well as with respect to the browsing context—will be presented to him spontaneously; the user will then be able to drag and drop onto this element any resource from his computer, such as the icon of a file of the client station, or else the URL of a web page, so as to store it. Thereafter, each time he visits any web page which is relevant with respect to this element, the resource that he had stored will be presented to him spontaneously, together with the resources (such as advertisements) that the author of the element had himself associated with the element. The advertisements presented will thus correspond to the current centers of interest of the user and are provided in exchange for a new associative memory service.

The invention is aimed moreover at harnessing modern user interfaces to create, in a particularly simple and intuitive manner, associations between information resources (web pages, or document files) especially within the framework of the above objectives.

The invention proposes according to a first aspect a method for determining relevant additional resources with respect to a given set of starting resources, characterized in that it comprises the following steps:

a) identifying a set of citing resources that consist of all the resources having a link to at least one of the starting resources, b) forming a set of candidate resources that consists of the set of resources cited by the citing resources, c) for each candidate resource, calculating a candidate resource relevance score between said candidate resource and the set of starting resources on the basis of the existence of links situated in the citing resources and directed toward the candidate resource and toward the starting resources, and on the basis also of citing resource relevance scores assigned to each of the citing resources, d) for each citing resource, recalculating a citing resource relevance score on the basis of the existence, in the citing resource in question, of links to the candidate resources and on the basis also of the candidate resource relevance scores allocated to the candidate resources in step c), e) repeating as appropriate step c) and step d) as appropriate one or more times followed by step c), f) determining said relevant additional resources as being the candidate resources which exhibit the best candidate resource relevance scores (and as appropriate also the citing resources which exhibit the best citing resource relevance scores).

The relevance score calculation performed in step c) comprises the calculation of a plurality of sums of citing resource relevance scores, each sum advantageously comprising only the relevance scores of the citing resources comprising a link to a given resource consisting of the candidate resource or a starting resource.

In a preferred manner, the above method also comprises the calculation of at least one sum of citing resource relevance scores, each sum comprising only the relevance scores of the citing resources comprising a link to one among a set of at least two given resources, this set comprising the candidate resource and at least one starting resource.

According to a second aspect, the invention proposes a method for determining relevant additional resources with respect to a given set of starting resources, characterized in that it comprises the following steps:

a) identifying a set of cited resources that consist of all the resources having a link to at least one of the starting resources,
b) forming a set of candidate resources that consists of the set of resources citing the cited resources,
c) for each candidate resource, calculating a candidate resource relevance score between said candidate resource and the set of starting resources on the basis of the existence of links situated in the candidate resource and in the starting resources and directed toward the cited resources, and on the basis also of cited resource relevance scores assigned to each of the cited resources,
d) for each cited resource, recalculating a cited resource relevance score on the basis of the existence, in the cited resource in question, of links to the candidate resources and on the basis also of the candidate resource relevance scores allocated to the candidate resources in step c),
e) repeating as appropriate step c) and step d) as appropriate one or more times followed by step c),
f) determining said relevant additional resources as being the candidate resources which exhibit the best candidate resource relevance scores (and as appropriate also the cited resources which exhibit the best cited resource relevance scores).

The invention furthermore proposes a system for browsing among information resources, each resource comprising at least one link activatable in a first mode by an input device so as to bring about access to another information resource designated by a resource identifier associated with this link, characterized in that at least certain resources comprise at least one link activatable in a second mode with the aid of an input device so as to send to an engine for searching for new information resources a search query containing the resource identifier associated with the link in question.

This system exhibits the following preferred but optional aspects:
the input device is able to activate the link simultaneously in the first and second modes.
the activation of the link in the second mode is able to bring about the displaying of a pre-existing query, to which the resource identifier associated with the link in question is able to be added.
the activation of the link in the second mode is able to display, in addition to the pre-existing query, the information resource designated by said resource identifier.

The invention also proposes a system for searching for new information resources on the basis of existing information resources, characterized in that it comprises a search engine based on the analysis of links between the various resources and accepting as input a query comprising a series of resource identifiers, a means of selecting identifiers which is able to store a set of identifiers (URI) of resources selected one after the other by a user, and a user activatable query generating means for devising a query containing the set of identifiers previously selected destined for the search engine.

In a preferred but nonlimiting manner, the means of selection is able to store the identifiers selected in a remanent manner, in such a way that the means of selection can be implemented in a manner staggered over time with a view to the generation of one and the same query.

The invention moreover proposes a method of searching for new information resources on the basis of existing information resources, characterized in that it comprises the implementation of a search engine based on the analysis of links between various resources and accepting as input a query comprising a series of resource identifiers and in that it comprises the following steps:

selection of identifiers (URI) of resources one after the other by a user;
generation of a query containing the set of identifiers previously selected destined for the search engine.

There is also proposed a method of searching for new information resources on the basis of existing information resources, characterized in that it comprises the implementation of a search engine based on the analysis of links between various resources and accepting as input a query comprising a series of resource identifiers and in that it comprises the following steps:
generation of a query containing a set of identifiers of resources previously stored in one and the same group of resource identifiers individual to a user, destined for the search engine,
generation of a signaling for the attention of the user when at least one new resource identifier belonging to the group in question has been found by the engine.

According to a preferred aspect of the above method, each group of resource identifiers is represented by a graphical object on a display device of the user, and in that said signaling is carried out at least by change of appearance of this graphical object.

The invention furthermore proposes a method of managing resources in a computer system provided with a display screen and with an input device for cursor movement and actuation such as a mouse, each resource possessing a representation displayed on the screen in such a way as to be able to be moved with the aid of the input device, method characterized in that it comprises the following steps:
movement of the representation of a first resource so as to bring it above the representation of a second resource,
followed by storage, in an associative memory for managing resources, of information of association between the first and second resources.

Certain preferred, but optional, aspects of this method are the following:
the movement step is performed by a drag and drop technique.
the method furthermore comprises, subsequent to the identification of a given resource in a resource consultation process, the following steps:
reading of the associative memory for managing resources to determine whether other resources are associated with said given resource, and
if so, signaling on the display screen of the existence of the associated resource or resources.
the resources comprise files.
the resources comprise resources accessible via a network such as the Internet.
the identification of a given resource is obtained via a process for identifying similar or relevant resources with respect to at least one starting resource.
in the case where the reading of the associative management memory determines the existence of several associated resources, the signaling step comprises the ordered signaling of at least part of said several associated resources.
the ordered signaling is based on the determination of relevance scores of said associated resources.
the associative memory for managing resources is contained in a server accessible from a plurality of individual stations in which the movement step can be implemented.
the associations between resources are stored user by user.
the associations between resources are stored in a mutualized manner between several users.

The invention also proposes a method for identifying on the basis of a text resource, part of said resource able to constitute a pertinent query for a search engine, characterized in that it comprises the following steps:
removing the nonpertinent words from the text;
establishing and completing a memory of links between parts of said text, where a part is linked to another when it contains at least one pertinent word in common;
implementing a method of determining resource scores by analysis of a graph of resource nodes connected by links, where each resource used in this method consists of a part of the text, on the parts of the text that are thus interconnected;
using at least one of the text parts consisting of the candidate resources determined by said method as query text or as basis for a query text.

Advantageously, the step of implementing the method for distilling resources is performed only with text parts selected as prevalent, where the citing text parts are the text parts which comprise at least one word in common with the prevalent text part or parts, where a link is created from each citing text part to the prevalent text part or parts, where the text parts containing at least one word also contained in the citing text parts are identified, so as to form a group of co-cited text parts, and where a link is temporarily created from each citing text part to each co-cited text part with which said citing text part possesses at least one word in common.

The text parts are typically phrases.

According to another aspect, the invention proposes a method of managing information resources such as web pages in a computer system comprising a user station furnished with a display screen, each resource possessing an identifier (URI) allowing its access from the user station, method characterized in that it comprises the following steps:
a) declaration by the user of an association between two resources, by associating with a second resource the identifier of a first resource;
b) identification of other relevant resources with respect to the second resource; and
c) during access to one of the other resources (current page), signaling of the existence of the first resource.

According to certain preferred but nonlimiting aspects:
step b) comprises the selection of other resources that are most relevant for the implementation of step c).
step a) is implemented for a plurality of second resources belonging to a group, and in that step b) comprises the identification of other relevant resources with respect to the set of second resources of the group.
step b) is triggered by the carrying out of step (a).
step (b) is implemented subsequently to the access envisaged in step (c) to determine whether the other resource which it has accessed is another relevant resource with respect to the second resource.
step (b) is implemented by supplying an identifier of the second resource to a server for determining relevant resources.
step (b) is implemented by identifying other relevant resources with respect to at least one intermediate resource (spot) with respect to which the second resource is predetermined as being relevant.
the method furthermore comprises the displaying, in the vicinity of an area for displaying resources, of representations of links to at least certain among the first resources, the intermediate resources, and relevant resources with respect to the intermediate resources.
step (a) is implemented by acting with the aid of an input device on graphical objects representative of the first and second resources.

The invention moreover proposes a method for identifying information resources accessible via recent links (such as web pages), relevant with respect to at least one given resource, characterized in that it comprises the following steps:
applying a query comprising an identifier of said given resource to a system for determining relevance between resources,
selecting a first set of resources that are the most relevant (e.g. best hub scores) with respect to said given resource,
searching, through each of the most relevant resources, for the regions possessing links to other resources of averagely high relevance, so-called relevant regions,
monitoring the appearance, in said relevant regions, of new links which point to resources which were not yet known to the system, so-called new resources,
selecting a second set of resources having a high relevance (e.g. best hypertext authority scores) with respect to said given resource,
selecting the new resources which have a highest similarity of content with respect to the resources of said second set of resources and according the new resources selected a relevance level (similarity authority score) dependent on time as a function of said similarity of content.

According to yet another aspect, the invention proposes a method for allowing access by a user to relevant information entities from a starting information entity, each information entity being accessible via an identifier (URI), characterized in that it comprises the following steps:
a) providing at least one similar information entity, exhibiting a content similar to that of the starting entity, and determining the identifier of the or of each similar information entity, and
b) determining on the basis of the or each similar information entity identifier a set of one or more identifiers of information entities relevant with respect to the or each similar information entity.

Preferred, but nonlimiting aspects of the above method are as follows:
the method furthermore comprises the following step:
c) allowing the user to access at least certain relevant information from their respective identifiers.
the method furthermore comprises the following step:
d) on the basis of the relevant information entity identifiers and of a given set of extra information entities, selecting the extra entities that are most similar to the relevant information entities.
the method comprises an extra step of sorting the relevant information entities by degree of relevance.
the sorting step is preceded by a step of calculating a relevance score with respect to the or each similar information entity for each of the relevant information entities.
each information entity consists of a page fragment written in a standardized mark-up language, or of such a page as a whole.
each identifier consists of a uniform resource identifier (URI) of the fragment or of the page.
step a) is carried out by selection by the user of one or more information entities similar to the starting information entity.
step a) is carried out by implementing a process for automatically determining similar information entities.
step a) is carried out by implementing a process for automatically determining similar information entities, followed by a selection by the user of one or more similar information entities from among the similar information entities determined by said process.

step b) is carried out by implementing a process for automatically determining relevant information entities.

the process for automatically determining relevant information entities comprises the analysis of a graph structure of identifiers that consists of the identifiers of information entities and of the identifiers designated by user activatable links contained in said information entities.

According to another aspect of the invention, a method for determining relevance scores of text units such as phrases in a textual document, comprises the following steps:

decomposition of the document into a plurality of text units, selection of at least one relevant text unit and of candidate text units, determination of the set of pertinent words contained in the relevant text unit (or units) and in each of the candidate text units, for each pertinent word contained in the relevant text unit (or units), identification of the candidate text units citing this pertinent word, to form a group of citing text units, identification of the candidate text units containing at least one pertinent word also cited in the citing text units, to form a group of co-cited text units, assigning to the co-cited text units a relevance score as a function of said citations.

The invention also proposes a method for determining relevance scores of text units such as phrases in a textual document, characterized in that it comprises the following steps:

decomposition of the document into a plurality of text units, selection of at least one relevant text unit and of candidate text units, determination of the set of pertinent words contained in the relevant text unit (or units) and in each of the candidate text units, for each pertinent word contained in the relevant text unit (or units), identification of the candidate text units comprising this pertinent word, to form a group of cited text units, identification of the candidate text units containing at least one pertinent word also cited in the cited text units, to form a group of co-citing text units, assigning to the co-citing text units a relevance score as a function of said citations.

The invention also proposes a method for determining scores allocated to words or groups of words contained in text units such as phrases in a textual document, characterized in that it comprises a step which consists in adding up the relevance scores, determined by one of the methods above, of the text units in which said words are located.

DETAILED DESCRIPTION OF PREFERRED EMBODIMENTS

Lexicon

Figure 1:
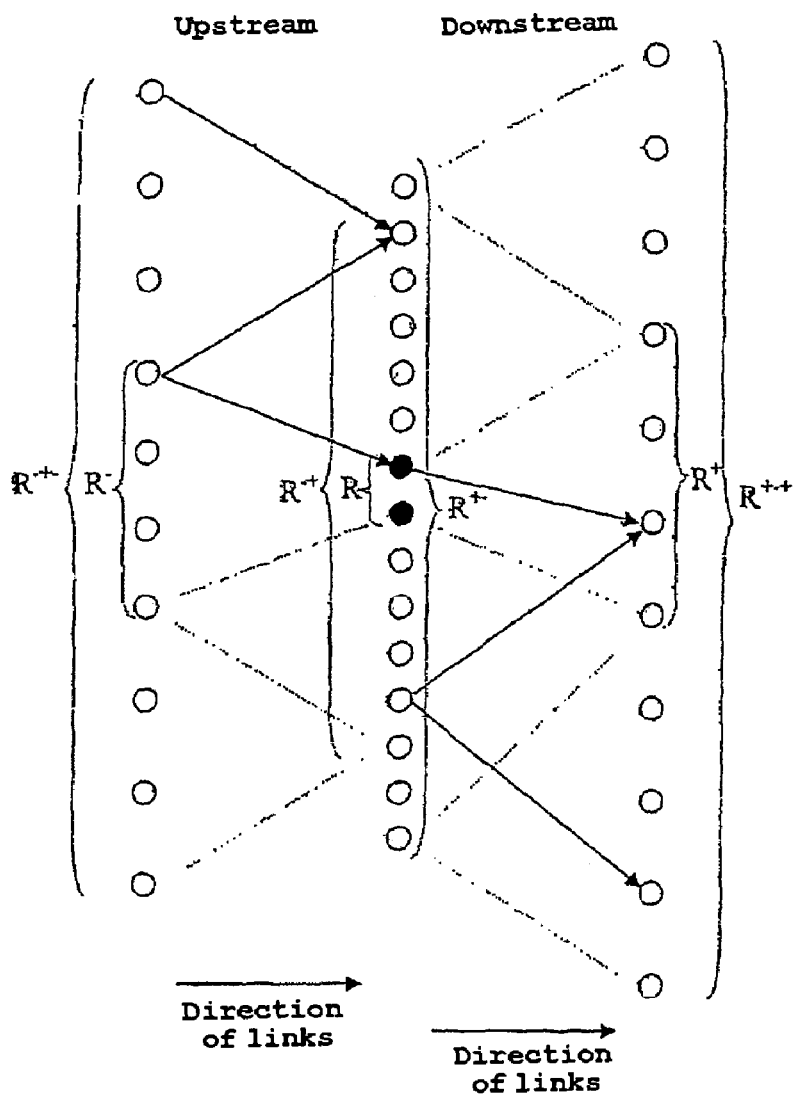
FIGS. 1 to 7 of the appended drawings illustrate various steps implemented in the present invention.

Resource (or element): Information resource such as a web page, a part of a web page, a document, or an XML element. Each resource may itself consist of resources, thus forming a tree structure.

Current resource: Resource accessed by the user at the current moment during browsing (it is in particular the web page displayed in the main window of the browser).

URI (Uniform Resource Identifier): Resource address. Will sometimes be used as a synonym for URL (universal resource locator).

Link: URI placed in a resource. In general, by clicking on a link, the user can access the resource pointed at by it.

Cite (a first resource cites a second resource): the first resource possesses a link to the second resource.

Popular: Said of a resource which is accessed by a large number of users (for example on the web) from its URI.

Private resource: Resource that is not accessible by a large number of users (in particular which is not published on the web or is not widely known).

Associative storage: Addition of a link to a first resource, on a second resource, so as to be able to retrieve the first resource via the associative search method.

Associative search: In order to retrieve a first resource, access to a relevant resource with respect to a second resource to which a link to the first resource has been added.

Added link: URI inserted by the user into a set of associated links.

Proposed spot: Spot presented by the system by priority since it comprises the associated links that are most relevant with respect to the current context.

Spot: A spot is composed:

of a set of links, in general associated with a reference resource. The resources pointed at by the associated links are accessible (for example on the web) from their respective URIs. The associated links are composed of given associated links and of completed associated links, and (optionally) of one or more set of link(s) (in particular links added by the creator of the spot and links added by users of the spot), proposed to the user within the framework of the associative search method, and (optionally) of a link to said reference resource, said associated links being selected as being relevant with respect to this reference resource, Domain of relevance of a spot: set of resources designated by associated links of this spot.

Given associated links: Associated links specified explicitly (by whoever creates or publishes the resource with which said set is associated, or else by whoever creates a spot for this resource).

Completed associated links: Associated links determined automatically (in particular by means of a relative distillation algorithm described in the present description).

Associated link score: Score of relevance with respect to the set of given associated links. This score may be calculated by a relative distillation algorithm such as one of those described in the present description.

Authority score: Relevance score of a resource with respect to a set of given associated links.

Hub score: Relevance score of a resource citing other resources, representing the relevance of the cited resources with respect to a set of given associated links.

Non-contextual score: Context independent relevance score.

Contextual score: Context dependent relevance score.

Noncontextual spot: With respect to a resource (or to a set of resources) in question: Spot whose associated links comprise the URI of the resource in question (or at least some of the URIs of the resources in question) with a score (or a mean score) that is greater than a given threshold or that is selected in such a way as to maximize it (cf. the spot selection procedure described in the present description).

Contextual spot: Spot whose associated links are the most relevant with respect to the context.

Context: Browsing context.

Spot server: Server on the Internet providing the association between associated link and spot.

Current spot server: Spot server to which the user is directly connected.

Relevant region of a resource: Part of a resource containing at least one relevant link and containing no nonrelevant link.

Methods of Associative Storage and Associative Search

[Vocabulary used:

First page=page stored by the user so that he can retrieve it easily;

Second page=page used by the user as storage medium (to store an association with the first page, which we shall subsequently refer to as "for storing the first page" for the sake of conciseness);

Current page=page presented at the current moment in the main window of the Internet browser.

These are for example web pages, however the first page may be a private resource such as a document (text, multimedia or other document) which belongs to him].

The system allows the user to add a link to a first page on any second page whatsoever (or in the vicinity of the second page; we shall subsequently use the expression "on the second page" for the sake of conciseness).[1]

[1] The step consisting in adding a link in this manner, on a second resource, to a first resource (so as to be able to retrieve it by the method described in this report) is called associative storage.

The user accesses the pages by means of a browser furnished with the system specific extension (or via an intermediate web server). Adding a link can be done for example by a drag and drop: the user grabs a handle representing the first page and drops it onto the second page; for example the link added is then presented by the system as a vignette in the style of a "post-it" in the place where it was dropped, or in a window adjacent to the main window of the browser (or in a frame adjacent to the frame presenting the original web page). He can also drop it on an icon representing the second page (for example in his favorite links). The system then stores the relation with the user considered, the association between the link on the first page and the second page in question.

Thereafter, when the user accesses a page relevant with respect to the second page (or the second page itself), the URI[2] of this added link to the first page is automatically presented to him.

[2] As well as optionally other indications pertaining to the link added, such as the text or the graphical object which accompanies the added link, or else a simplified or miniaturized presentation of the first page itself.

Thus, to retrieve the first page, the user merely has to access any page whatsoever[3] which is relevant with respect to the second page.

[3] Said any page whatsoever is already or will have to be taken into account by the system. The user will thus prefer to choose a popular page to speed up the search. The system is furnished with a crawler the aim of which is precisely to take into account as many accessible pages (especially on the Internet) as possible which are of interest to the user.

More simply, in so far as:

the user chooses said second page because it is relevant with respect to the first page and that the relevance relation is transitive at this level, to retrieve the first page, the user merely has to access any page (accessible by the system) which is relevant with respect to the first page: this is the associative search method.[4]

[4] To facilitate reading, the storage/associative search method is described here while speaking of pages, but the method applies more widely to resources (not only to pages).

Note that during the step of associative storage the user can increase his chances by adding a link to the first page on several second pages.

Furthermore, in so far as the relevance relations are symmetric, the added links are implicitly bi-directional. Furthermore, in the case where the current page is a private resource, the system can liken it to the second page(s) on which, as appropriate, the user had added a link to this private resource, and present the other first pages that he also added on this (these) second page(s).

The step of associative storage can be automated (or be computer aided). Specifically, the addition of a link to a first page on a second page can be (semi-) automated according to the following steps:

I—determine key words or main phrases of the first page (that are contained in the page or associated with it—for example are delimited by "meta-tags"), II—provide these key words or main phrases to a search engine which will return a set of links on pages containing these key words, III—take at least one subset thereof (for example the best N according to the search engine) so as to use them as second pages, IV—add a link to the first page on these second pages.

Note that as regards step I, various techniques for automatically extracting key words or main phrases of a text already exist.

The key words may also be extracted from the text in the following manner:

for each word, determine the score of this word by adding up the scores of the phrases in which it is located and then normalizing these scores (for example by dividing each score thus obtained by the square root of the sum of the squares of all the scores thus obtained);

select the words having the largest scores as key words.

The two methods presented above may be combined by retaining from the key words selected only those which are located in the phrases selected. The complete method for extracting the key words from the text is then as follows:

remove the nonpertinent words from the text (called "stop words" in the literature);

identify the links between the phrases: a phrase is linked to another when it contains at least one word in common;

apply the absolute distillation procedure (described later), or an equivalent procedure utilizing a graph of links (such as PageRank), to the phrases thus interlinked, to determine their scores;

for each word, determine the score of this word by adding up the scores of the phrases in which it is located and normalized;

select the phrases having the largest scores as being the main phrases of the text.

As a variant, in so far as (one or) certain phrases of the text may be labeled as being prevalent, to determine the scores of the phrases, instead of the absolute distillation procedure it is possible to use the relative distillation procedure (described later) to determine the relevance score of the phrases with respect to said prevalent phrases.

Moreover, instead of actual phrases, it is possible to consider any kind of text parts or units. The method using relative distillation thus consists in determining relevance scores of co-cited "text units" (such as phrases):

The text units comprising at least one word in common with the prevalent unit (or set of units) are identified so as to form a group of citing text units. A link is created (temporarily) from each citing text unit to the prevalent text unit (or set of units).

The text units containing at least one word also contained in the citing text units are identified so as to form a group of co-cited text units. A link is created (temporarily) from each citing unit to each co-cited unit with which said citing unit possesses at least one word in common.

One of the methods, described later, of calculating relevance scores by the relative distillation procedure is then applied. The whole set of identifiers of the relevant text units constitutes the URIs of the query.[5]

[5] The set of identifiers of the citing text units constitutes the set $R^-$. The set of identifiers of the co-cited text units constitutes the set $R^-$, and so on and so forth.

The implementation of the associative search system will now be described.

To present, to a user who accesses a current page, links on first pages, the system performs the following steps:

Step a: determine the relevance score of second candidate pages with respect to the current page[6],

[6] This step is composed of step a and/or step a' (see later . . . )

Step b: select the (or a certain number of) second pages having (as appropriate) a sufficient relevance score, Step c: present to the user the (URIs of the) first pages of the links that he had added on the second pages which have been selected in step b; optionally also present the (URIs of the) second pages themselves to him.[7]

[7] To do this, as already mentioned, the system possesses in memory the relation between user, second page (on which the user in question has added links) and first page (link added by the user in question on the second page in question). Thus the system can firstly determine the set of second candidate pages for the current user so as to perform step a, then in step c retrieve the added links to be presented to the user.

As a variant, during the associative storage, instead of adding on the second page a link to the first page, the user can overlay onto the second page or insert thereinto an annotation (or any resource such as an icon or other graphical object), which then plays the role of first page within the sense of the present method. In this case, during step c) of the associative search, the system presents the second page or pages which have been selected while also presenting their annotations (or the resource that has been added to them).[8]

[8] In the remainder of the description, the expression link added on a second page is understood to mean that we include this typical case where there is a resource added to the second page.

To facilitate reading, the following 7 steps (see FIG. 1) will be considered:

R consists of the pages[9] of the query.

[9] ("page" is understood to mean "page URI")

$R^-$ is the set of pages which contain a link to[10] at least one page of the query.

[10] (stated otherwise "which cite", or else "which point at")

$R^{-+}$ is the set of pages pointed at (cited) by at least one page of $R^-$.

$R^{-+-}$ is the set of pages which cite at least one page of $R^{-+}$ ($R^- \subset R^{-+-}$):

$R^+$ is the set of pages cited by at least one page of the query (R).

$R^{+-}$ is the set of pages which cite at least one page of $R^+$.

$R^{+-+}$ is the set of pages cited by at least one page of $R^{+-}$ ($R^+ \subset R^{+-+}$).

To determine the relevance score of the second candidate pages with respect to a current page R (understand R here as current resource[11]), the system implements a method of "relative distillation" comprising at least one out of the following steps a and a'.

[11] Since here the query is formed of a single page.

Step a:

Step a-1: Identify the set $R^-$ of pages which possess at least one link to R;[12]

[12] A web search engine can be used to determine the resources that point to a given resource.

Step a-2: Retrieve in memory the set of second candidate pages for the current user and perform the intersection between the set $R^{-+}$ of the pages pointed at by the pages of $R^-$ (note that R is in the set $R^{-+}$) and the set of second candidate pages for the current user;

Step a-3: For each page of the set resulting from step a-2, calculate its relevance score (authority score) with respect to R. (Note that this step includes the identification of the set of pages of $R^{-+-}$ possessing at least one link pointing to at least one subset of the set resulting from step a-2—see the "selection of spots" section).

Step a':

Step a'-1: Identify the set $R^+$ of pages pointed at by R;

Step a'-2: Retrieve in memory the set of second candidate pages for the current user and perform the intersection between the set $R^{+-}$ of pages possessing at least one link to a page of $R^+$ (note that R is in the set $R^{+-}$) and the set of second candidate pages for the current user;

Step a'-3: For each page of the set resulting from step a'-2, calculate its relevance score (hub score) with respect to R. (Note that this step includes the identification of the set of pages of $R^{+-+}$ pointed at by at least one subset of the set resulting from step a'-2).

The calculation of the relevance scores in steps a-3 and a'-3 may be performed by means in particular of one of the equations presented later in the "selecting the spots" section which moreover describes improvements to the method presented above. In particular the scores are sharpened by successive iterations. During these iterations, the hub pages in step a and the authority pages in step a' also acquire relevance scores (hub scores and authority scores respectively). In addition to the second candidate pages (that is to say in addition to the URIs of the pages of $R^{-+}$ in step a and/or of $R^{+-}$ in step a') determined as described hereinabove, it is then also possible to include, in the resulting set provided at step b, the hub pages of step a and the authority pages of step a' (since they now have relevance scores). Moreover the weights of the links between close pages[13] are diminished so as to further improve the results.

[13] To identify the closeness of the pages to the ends of the links the system additionally identifies the set of pages $R^-$ of the pages possessing at least one link to the pages $R^-$ and the set of pages $R^{-+-}$ of the pages possessing at least one link to the pages $R^{-+}$ (see the "filtering" section).

The system can therefore select the second pages that are most (or sufficiently) relevant to step b and perform step c to present their added links to the user.

The results obtained by the relative distillation method may be stored (then maintained—see later the "maintaining the spots" section) with the aim of avoiding recalculating them during accesses to the current pages already processed. Thus, the system maintains, in a second memory, the scores of the second pages with respect to the current pages in the cases where these scores are greater than a given threshold. For a current page already processed, the response of the system is then almost immediate.

Stated otherwise, step a is modified as follows:

Step a': Consult the second memory to ascertain whether the second pages most relevant for the current page have already been stored (and if these data in memory are sufficiently fresh), as appropriate go to step c, otherwise determine and store the relevance score of second candidate pages with respect to the current page.

As a variant, the system stores (then maintains—see later the "maintaining the spots" section) the necessary data without waiting for a user to access a current page; storage is triggered by the use, by the user, of a new second page (as associative storage medium).

By utilizing the fact that the relevance scores are reflexive[14], the system starts from each second page to construct $R^-$ and $R^{-+}$ and $(R^{-+-})$ and/or $R^+$ and $R^{+-}$ (and $R^{+-+}$), calculates by relative distillation the relevance scores of all the potential current pages, and stores them in a second memory (this being an inverse memory able to provide, for each potential current page, the second relevant pages).

[14] (i.e. the relevance score of a second page with respect to a current page is equal to the relevance score of this current page with respect to this second page)

Moreover, as already indicated, the system maintains a first memory containing the links added by user and second page.[15]

[15] Note that, advantageously, the data in the second memory are not per user and may thus serve all the users.

Thus, when a user actually accesses a current page, the system selects from the second memory the second pages—from among the second pages used by this user as storage medium[16]—which have the highest relevance scores with respect to said current page, then retrieves (from the first memory) the links added by this user on these second pages.

[16] (they are indicated in the first memory)

Stated otherwise, the method comprises the following steps[17].

[17] Steps m1 and m2 describe the associative storage method, steps a, b and c describe the associative search method.

For each new second page R (on which a user adds a link)[18]:

[18] Step m1 is performed only for the new second pages, while step m2 is performed each time a second page is used by a user, whether or not it is new for the system.

Step m1: Perform at least one of steps m1-1 and m1-1', then perform step m1-2:

Step m1-1:

identify the set $R^-$ of pages which possess at least one link to R;

identify the set $R^{-+}$ of potential current pages pointed at by the pages of $R^-$;

for each page of $R^{-+}$ (except R) calculate its relevance score (authority score—see the "selecting the spots" section) with respect to R; note that this step includes the identification of the set of pages $R^{-+-}$ possessing at least one link pointing at at least one subset of $R^{-+}$ (see the "selecting the spots" section);

Step m1-1':

identify the set $R^+$ of pages to which R possesses at least one link;

identify the set $R^{+-}$ of potential current pages pointing to at least one page of $R^+$;

for each page of $R^{+-}$ (except R) calculate its relevance score (hub score—see the "selecting the spots" section) with respect to R; note that this step includes the identification of the set of pages $R^{+-+}$ pointed at by at least one subset of the elements of $R^{+-}$;

Step m1-2: store, in a second memory, the URIs of the pages having a sufficient relevance score with respect to R, in relation to R, in such a way that on the basis of the URI of each of said pages having a sufficient relevance score with respect to R it is possible to retrieve[19] (the second page) R as well as said sufficient relevance score;

[19] (As well as the other second pages, as appropriate, for which the relevance score of R is sufficient)

Step m2: (in parallel with step m1) store in a first memory, for each user and each second page, the added links that said user has added on said second page;

During access to a current page by a user:

(Step a is no longer necessary since the scores are already in memory).

Step b-m: Select from the second memory a certain number of second pages[20], from among the second pages used by said user (that are indicated in the first memory), for which the relevance scores of said current page are the highest (if they exist);

[20] Normally, in the second memory, the URIs of the second relevant pages with respect to a potential current page are already sorted by relevance score.

Step c (unchanged): retrieve from the first memory the links added by said user on the second pages selected in step b-m and present them to said user (with optionally the second pages on which they have been added and in a sorted manner).

The improvements presented later in the "selecting the spots" section will also be applied. In particular as the scores are sharpened by successive iterations, the hub pages in step m1-1 and the authority pages in step m1-1' also acquire relevance scores (hub scores and authority scores respectively) and may thus be included in the resulting set provided in step m1-2 (in addition to the URIs of the pages of $R^{-+}$ in step m1-1 and/or of $R^{+-}$ in step m1-1'). Moreover, here also the weights of the links between close pages are diminished so as to improve the results (see the "filtering" section).

With this latter method, the added links are presented almost immediately by the system in all cases, that is to say even when a current page is accessed by a user for the first time.

It was mentioned that during the associative storage step the user can increase his chances by adding a link to the first page on several second pages. He will now be allowed to form groups of second pages to which is added a link to the first page (the idea being that, as the first page may be of interest with respect to more than one center of interest of the user, the groups make it possible to class the first page with respect to distinct centers of interest, each group corresponding to a different center of interest).

Specifically, each time the user adds a link (to the first page) on a new second page, the group or groups of second pages that he had already formed, as appropriate, for the first page are proposed to him by the system and he can then choose one or more of these groups into which to insert said new second page, or otherwise he can create a new group formed of the single new second page.

At the same time he can also manipulate his groups more widely, such as for example delete a second page of a group, split a group into two, merge two groups, delete a group, etc. Finally, he can also duplicate a group so as to add thereto a link on another first page.

Each group is processed by the system as a relative distillation query. In a similar manner to the last method described[21], for each query R (that is to say for each group of second pages) the system identifies and stores (then maintains—see later the "maintaining the spots" section) the potential current pages which have a sufficient relevance score, and thus forms an inverse memory able to provide, for each potential current page, the most relevant queries (that is to say the most relevant groups).

[21] The difference is that here R represents a query formed of one or more resources whereas before R represented a single resource (a single second page).

Stated otherwise, the associative storage comprises the following steps:

(Step m1 is performed only for the queries not already known by the system or not sufficiently fresh, while step m2 is performed for all the users' queries, whether or not they are new for the system).

Step m1: Perform at least one of the steps m1-1 and m1-1', then perform step m1-2:

Step m1-1:

identify the set $R^-$ of pages which possess at least one link to a page of R;

identify the set $R^{-+}$ of pages (seen as potential current pages) pointed at by at least one page of $R^-$;

for each page of $R^{-+}$ (except R) calculate its relevance score (authority score—see the "selecting the spots" section) with respect to R; note that this step includes the identification of the set of pages $R^{-+-}$ possessing at least one link pointing to at least one subset of $R^{-+}$ (see the "selecting the spots" section);

Step m1-1':

identify the set $R^+$ of pages to which at least one page of R possesses at least one link;

identify the set $R^{+-}$ of potential current pages pointing to at least one page of $R^+$;

for each page of $R^{+-}$ (except R) calculates its relevance score (hub score) with respect to R; note that this step includes the identification of the set of pages $R^{+-+}$ pointed at by at least one subset of $R^{+-}$;

Step m1-2: Store, in a second memory, the URIs of the pages having a sufficient relevance score with respect to R, in relation to R, in such a way that on the basis of the URI of each of said pages having a sufficient relevance score with respect to R it is possible to retrieve[22] R as well as said sufficient relevance score;

[22] (From among the set of queries stored, as appropriate, for this page)

Step m2: (in parallel with step m1) store in a first memory, for each user and query, the added links (to first pages);

During access to a current page by a user:

Step b-m: Select from the second memory a certain number of queries, from among the queries (groups) used by said user as associative storage medium (that are indicated in the first memory), for which the relevance scores of said current page are the highest (if they exist);

Step c: retrieve from the first memory the links added by said user on the queries selected in step b-m and present them to said user, with optionally:

the (or a certain number of the) queries on which they have been added, as well as a certain number of (links to) relevant pages having a relevance score estimated (in step m1-2) to be sufficient with respect to said queries selected in step b-m.[23]

[23] These URIs are analogous to "related links" mentioned in the "state of the art" section, however they are more relevant since their relevance scores have been calculated with respect to the query with which they are associated by relative distillation.

The improvements presented later in the "selecting the spots" section will also be applied. In particular as the scores are sharpened by successive iterations, the hub pages in step m1-1 and the authority pages in step m1-1' also acquire relevance scores (hub scores and authority scores respectively) and may thus be included in step m1-2 (in addition to the URIs of the pages of $R^{-+}$ in step m1-1 and/or of $R^{+-}$ in step m1-1'). Moreover, here also the weights of the links between close pages are diminished so as to improve the results (see the "filtering" section).

In step b-m, the system provides a set of selected queries. It would be advantageous to sharpen the selection in such a way as to present to the user (the) request or requests[24] that are the most relevant with respect to the user's browsing context. This is what will now be described.

[24] (With the first pages and the corresponding relevant links)

The history of a user's browsing is modeled with the aid of a "context stack", here with each link (that may be presented to the user) is associated a relevance score at each browsing level, and when a link is nonexistent it is likened to a link whose score is equal to zero.

When the user clicks on a link and accesses a new page, the system adds a level to the context stack. On the other hand, when he clicks on the "back" command of his browser the system pops a level.

For a given link, the contextual score is an average of the noncontextual scores[25] at each level of the context stack, these scores being weighted as a function of depth. So as not to have to recalculate all the scores each time, an exponential weighting is used, this implying that the contextual score at a certain level is the weighted average of the noncontextual score at this level and of the contextual score at the previous level.

[25] (That is to say determined taking no account of the context)

Stated otherwise, for a given URI, s being the noncontextual score at the last level and r the contextual score at the previous level, the contextual score at the last level is: lambda.r+(1–lambda).s (lambda being a constant weighting between 0 and 1, in principle less than ½: the larger lambda is, the more important is the past).

Among the queries (that is to say the groups) selected in step b-m, the system selects those which are closest to the context, that is to say those for which the scores of the URIs stored in step m-2 are the closest to the contextual scores for the user in question. To determine the closeness of each request with the context, the system calculates the sum of the products, for each URI of the query, of the (noncontextual) score of the query with the contextual score for the user in question.

Step b-m is thus replaced by the following step b'-m:

Step b'-m: select from the second memory a certain number of queries, from among the queries (groups) used by said user as associative storage medium (and indicated in the first memory), for which the relevance scores of said current page are the highest (if they exist) and for which the relevance scores of the potential current pages are the closest to the contextual relevance scores.

We shall now describe a method, utilizing the system of cookies, for recognizing the user when he goes from one site to another, in such a way as to be able to maintain his context stack.

Let us recall that the cookies system allows servers of sites of an Internet domain (i.e. domain name or IP address) to recognize a user (that is to say his computer) when he accesses web pages belonging to one and the same Internet domain.

The method described here allows a server, which implements our method—it will be called a client server (CLI)—to recognize even users who browse from one site to another which do not form part of one and the same Internet domain, even though in their browsing these users pass through sites that do not implement our method.

To do this, three communication mechanisms are used:

1—Each web page of a site of a client server contains a frame whose address is that of a centralized server (URS) which manages our method of recognizing the user (USER);

2—The centralized server and each client server each have a cookie stored in the user's computer (note that the creation time for these cookies may be used to estimate the reliability of recognition of the user);

3—The client server communicates with the centralized server directly.

Figure 2:
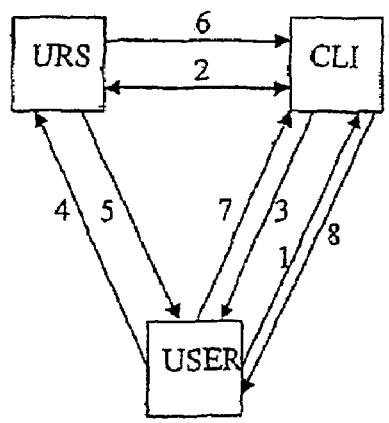

There are three possible cases which are described hereinafter (see FIG. 2).

New user for the client server and for the centralized server:
1. The user (the USER computer) opens a page of the clients site (CLI server); there is no CLI cookie.
2. CLI asks URS for a free identifier for USER and receives ID="123456"
3. CLI sends back a page comprising two frames to USER
   the first frame is at the address http://URS.com/ . . . ?ID="123456"
   the second frame is at the address http://CLI.com/ . . .
4. USER sends the http query to URS to ask for the content of the first frame (http://URS.com/ . . . ?ID="123456"); as there is no cookie belonging to URS, URS concludes that this is a new user and allocates him the identifier "123456".
5. URS responds and installs a cookie (containing ID="123456" at USER
6. (In parallel with 5.) URS transmits [ID="123456" (no replacement)] to CLI
7. (In parallel with 4.) USER sends CLI the http query to ask for the content of the second frame
8. (After receipt of the identifier at point 6) CLI sends USER the content of the frame http://CLI.com/ . . .

New user for the client server but not for the centralized server:
1. USER opens a page of the client site (CLI server); there is no CLI cookie.
2. CLI asks URS for a free identifier for USER and receives ID="123456"
3. CLI sends back a page comprising two frames to USER
   the first frame is at the address http://URS.com/ . . . ?ID="123456"
   the second frame is at the address http://CLI.com/ . . .
4. USER sends the http query to URS to ask for the content of the first frame (http://URS.com/ . . . ?ID="123456") as well as the content of the cookie (created during a previous access and comprising the identifier ID="ABCDEF")
5. URS responds
6. (In parallel with 5.) URS transmits [ID="ABCDEF" replacing ID="123456"] to CLI (+optionally extra data specific to ID="ABCDEF")
7. (In parallel with 4.) USER sends CLI the http query to ask for the content of the second frame
8. (After receipt of the identifier "ABCDEF" at point 6.) CLI sends USER the content of the frame http://CLI.com/ . . . as well as a new cookie comprising ID="ABCDEF" as replacement for the previous one User already known to the centralized server and to the client server:
1. USER opens a page of the client site (CLI server) and transmits the content of the cookie associated with CLI (ID="ABCDEF")
2. (This step is not applicable)
3. CLI sends back a page comprising two frames to USER
   the first frame is at the address http://URS.com/ . . . ?ID="ABCDEF"
   the second frame is at the address http://CLI.com/ . . .
4. USER sends URS the http query (http://URS.com/ . . . ?ID="ABCDEF", to ask for the content of the first frame) as well as the content of the cookie (created during a previous access and also comprising ID="ABCDEF")
5. URS responds
6. (Optionally, CLI can ask for and/or receive extra data from URS for ID="ABCDEF")
7. (In parallel with 4.) USER sends CLI the http query to ask for the content of the second frame
8. CLI sends USER the content of the frame http://CLI.com/ . . . (as appropriate after receipt of the data in step 6.)

The method described above makes it possible to select the links to be displayed in the web pages as a function of the browsing context[26]. This is what will now be described.

[26] (Or, as described above, to select the queries themselves; this being trivial, it is not described again)

Let us start from the situation where each query (the server which hosts it) possesses a set of initial URIs as well as the set of links that could be proposed to the user with their default scores: the noncontextual scores.

As already described, the contextual score is an average of the noncontextual scores, weighted as a function of depth, at each level of the context stack. Thus, $r_i$ being the noncontextual score at the last level and $\tilde{r}_i$ the contextual score at the previous level, its value after having followed a link is: $\tilde{r}_i \blacklozenge \lambda \tilde{r}_i + \lambda r_i$[27].

[27] Thus giving $\tilde{r}_i = \overline{\lambda}_{n=0}^{d-1} \lambda^n r_{i,n} + \lambda^d r_{i,d}$ with d the depth of the root and $r_{i,n}$ the score of page $P_i$ at depth n.

The links presented to the user are those which have the largest contextual score.

The context stack can be displayed in the URS frame (the first frame) introduced above. Thus the user can see which pages are the ones that were involved in the calculation of the pages to be displayed. He can click elements of the stack to climb back up the levels, and an "Erase" button makes it possible to empty the context stack.

The context stack is stored, for each user, in the centralized server (URS), with the user's identifier. Thus, each time a user opens a page at a client server (CLI), the latter, having obtained the user's identifier, will give URS the noncontextual scores[28], which will respond with the contextual scores after having performed the weighted average described above[29]. The server of the client site may then display in the page the links which have the best score.

[28] To avoid unnecessary traffic it is possible to select the pages to be sent, taking only those that have a score greater than a certain threshold, for example half the threshold required in order for a page to be displayed to the user

[29] This is performed within the framework of step 6 described above.

Figure 3:
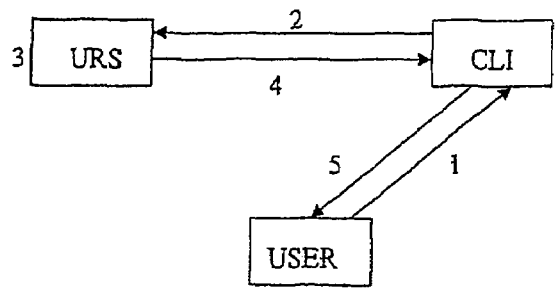

The steps are thus as follows (see FIG. 3):
1. The user (USER) sends an http query to open a page.
2. The client server (CLI) transmits the noncontextual scores of the page in question and the user's identifier to the centralized server (URS)
3. URS adds a level to the context and calculates the contextual scores
4. The contextual scores (at least the best of them) are returned to the client server
5. The client server selects the links which have the best score and presents them to the user.

It may be beneficial on the one hand to group the links in various parts of the pages, or even to hierarchize the parts, that is to say to allow parts to contain subparts, in addition to links. Here are the changes that this involves:

The current context[30] must contain context information for each part of the page displayed, hence when the page sends its noncontextual scores, it sends as many of them as there are parts, and URS responds to it with a context for each part. To avoid certain problems (see the following points), a default context is also necessary, representing the page itself and its parts and aggregating all the scores of all the links

[30] That is to say the set of contextual scores of the links at the current level.

When the user clicks on a link, the context of the part which contains this link must be used as last-level context (i.e. that context will be used for the calculation of the scores at the subsequent levels). A means of obtaining this result is to place in the addresses of the links an argument which contains an identifier (unique for the page) of the part, which identifier is also transmitted to URS with the noncontextual scores.

In the implementation of the method described here, care must be taken not to confuse the parts of various pages, for example if the user has opened several windows of his browser and clicks in a window after having clicked in another (URS stores only a context stack). This may be done by comparing the field HTTP Referer with the address of the last level of the stack and take no account of the part number other than in the case of equality. In other cases (also if the user has passed through a page of a nonclient site), the default context is taken.

Figure 4:
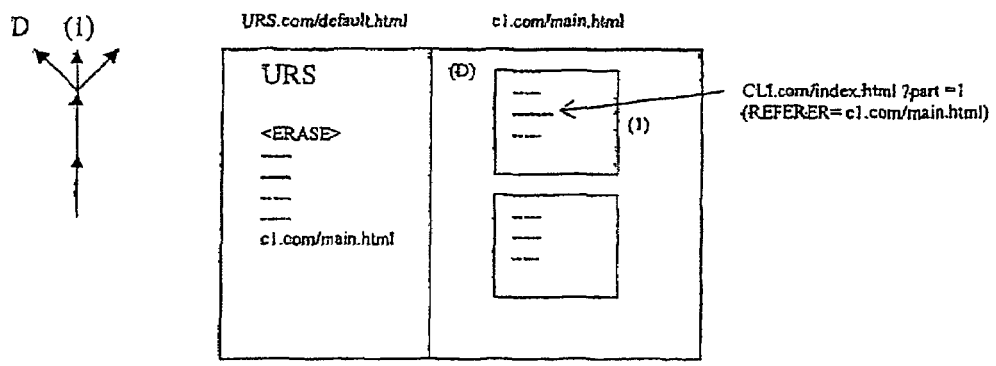
Figure 4:
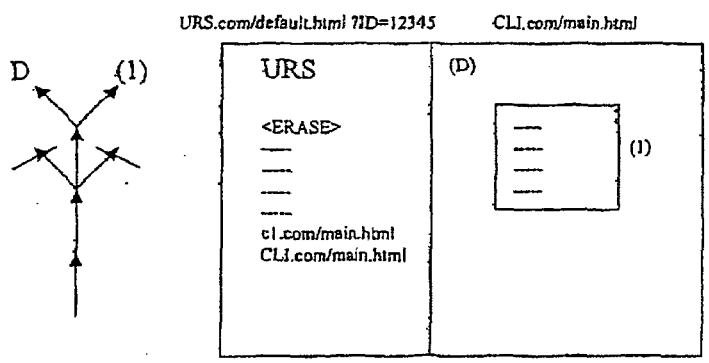
Figure 5:
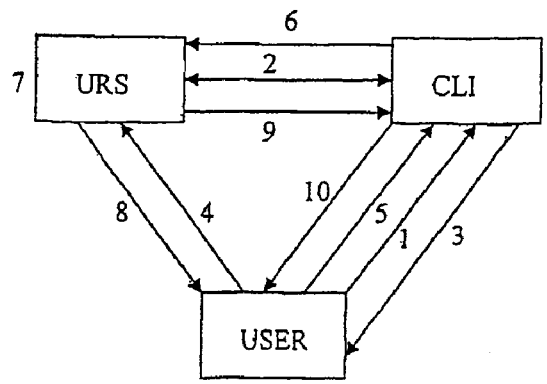

A more complete example (see FIGS. 4 and 5):

Here therefore is what happens when the user, already in a particular context (for the page cl/com/main.html), clicks on a link http://CLI.com/index.html?part=1 (part=1 signifies that the user has clicked in part 1). It is assumed that the client server CLI does not yet know the user:

(1) The browser (USER) sends the query http://CLI.com/index.html?part=1 to the server of the client site (CLI), additionally giving him the Referer http://cl.com/main.html (the address of this frame).
(2) CLI will ask URS for a free number (it responds to it with 12345) for this user
(3) CLI responds to (1) with a page comprising two frames whose addresses are http:/URS.com/default.html?newID=12345 and http://CLI.com/main.html respectively. He also gives him a temporary cookie (session cookie) newID=12345.
(4) The user being known to URS, it has a cookie with its true identifier (678910). By loading the frames, it (its browser) will send a query for the page http://URS.com/default.html?newID=12345 with the cookie ID=678910.
(5) The user also sends a query for the page http://CLI.com/main.html with the session cookie newID=12345.
(6) Having received (5), the client CLI sends URS its address (http://CLI.com/main.html), its noncontextual scores, for each part of the new page, the identifier newID=12345, as well as the part number (part=) that it received to the message (1).
(7) When it has received (4) and (6), URS looks at the context of the user for part 1, verifies that the source page (http://CLI.com/main.html) corresponds to the last level of the context stack for this user (otherwise it would have ignored the part number and taken the default part ("D"). Thereafter it calculates, for each part of the new page the new contextual scores.
(8) URS, having received the message (6), can respond to the message (4) of the user (presenting him with the new context stack and the <ERASE>button).
(9) URS also responds to the message (6) from CLI, sending it the true identifier of the user (678910), as well as the contextual scores.
(10) CLI can now respond to the message (1), giving the user are true identifier (permanent cookie ID=678910, for the site CLI.com), as well as the personalized page.

The concept of user can in reality encompass several users who share added links (and the groups which serve them as support). Of course, a finer organization of the users according to the added links that they share is possible.

We shall now describe the case where an end user subscribes to a provider user so that, according to the context, the system proposes the groups and first pages (in the sense of the groups and first pages described hitherto) created by the provider user to the end user. The first pages may in particular be advertisements which (by virtue of the capabilities of the system as hitherto) are automatically selected with respect to the context.

The groups created by the provider user and proposed by the system to the end user are called "spot".

The provider user manipulates and utilizes the spots as described hitherto for the groups of second pages.

The end user can use a spot as storage medium by making a personal version thereof and adding thereto a link to a first page (this is described later).

The main advantage of this approach is to afford the possibility of creating new spots (and the expensive calculations of scores that they involve) to certain users only (namely the provider users) and to offer the function of storage/associative search by way of pre-existing spots (which is not expensive in terms of machine resources) to all users.

Spot

The system that we shall now describe provides relevant links (also known as "related links", see above the "state of the art" section). However, rather than searching for relevant links directly, our system searches firstly to see whether there exists a spot—or reference resource—whose associated links are sufficiently close to the current resource or to the browsing context of the user. If such is the case, the system returns the spot(s) whose associated links are the closest, as well as its associated links offered in the guise of relevant links.

Typically the spot is proposed in a window adjacent to the main window of the browser, like the existing systems providing "related links", however in contra-distinction to these existing systems the system of the invention presents relevant links determined according to a relative distillation method (detailed later), the browsing context taken into account by our system is not necessarily solely the current page, but may include the set of resources accessed recently by the user (using the system) and which are relevant with respect to the current resource[31]

[31] See above the description of the method of selecting groups of second pages (here of spots) according to the user's browsing context.

the spots serve as associated memory for the provider users; specifically, when a spot is presented to an end user, the links to first pages (or other added resources[32], as described previously) added by the provider user who created the spot are presented to said end user[33],

[32] The latter include in particular advertisements billed to promoters. Advantageously, these advertisements are relevant with respect to the context (in any event the spots which serve them as support are).

[33] (The latter possibly moreover being said provider user who created the spot)

the spots serve as associative memory for the end users; specifically, when the end user adds a link to a first page on a second page (as described hitherto), in reality he adds a link on his personal version of the spot proposed for this second page or for the current context.

Furthermore, presenting the end user with relevant links by way of spots offers advantages per se, such as prompting to click in order to access the reference resource (that is to say the page presenting the spot).

Let us now examine a few typical storage/associative search scenarios implementing spots.

First Scenario of Use:

The provider user creates a new resource or chooses an existing resource (for example a web page which he wishes to access, or a particular element contained in a page . . . ) so as to make thereof the reference resource of a new spot.

To do this, he allocates it at least one given associated link pointing to a popular page.

The system completes the set of associated links[34] (as described in the "selecting the spots" section).

[34] This is the equivalent of the second memory described in the previous section.

Thus, in the future, each time an end user accesses a resource pointed out by one of the links associated with this spot, this spot may[35] be proposed to him. Also, as described in the subsequent two scenarios of use, end users may then use this new spot as storage medium (in a manner analogous to the use of a second page or of a group of second pages, described above).

[35] It will not necessarily be this spot that is proposed but rather, among all the spots whose associated links point to resources forming the current context, the spot in which these associated links have the highest relevance scores (or the spots in which these associated links have the highest relevance scores). The selection of the spot (or spots) is described in the "selecting a spot" section.

The creator of this spot thus has the advantage not only of putting it to his own use but also of seeing it proposed to end users. As a link on the reference resource (prompting the user to click) is included in the presentation of the spot, the reference resource is thus promoted to the end users. Moreover, its added links (such as advertisements) on this spot will be presented to the end users.

Second Scenario of Use:

On the web the end user "lands" on a first page (or other type of resource) that is so interesting that he would like to store it in order to be able to retrieve it easily and land back on it spontaneously when he accesses resources that are relevant with respect to it.

Let us assume that no spot is spontaneously proposed by the system for this page.[36]

[36] In the converse case, on (his personal version of) this spot, the user will directly add a link to this first web page. Note however that this action is not strictly necessary. Specifically, already without doing anything the user will have to retrieve this first page by visiting a close page that is not very popular (in the guise of relevant link associated with this same spot or with a neighboring spot). However, by doing this action the user has the extra advantage of being able to retrieve it in the guise of link added explicitly by him, that is to say in such a way that it is made evident.

The user visits a (at least one) second page, which is relevant with respect to the first, and for which he knows that a spot is proposed, or else he chooses a web page which is popular since it is thus more probable that a spot is proposed for it, and on the spot which is proposed for this second page he adds a link to this first page (for example by selecting a graphical object representing a first page and by performing a drag and drop thereon on the second page, as described at the start of the description).

In the future, this added link will then be presented to him spontaneously each time that this same spot, or that a close spot, is proposed to him for the current context of his browsing.

Third Scenario of Use:

The end user wishes to store a private resource (such as a document which belongs to him and which is not published on the web). The private resource here plays the role of first page.

He accesses a (second) page which is relevant with respect to his private resource (and which preferably is popular, or for which he knows that a spot is proposed) and he adds thereto a link to his private resource (that is to say he inserts this link into his personal version of the spot proposed for this second page).

Optionally, to reinforce his action, he will also add a link (to his private resource) on yet (other spots which are proposed to him for) other second pages that he finds relevant with respect to his private resource.

In the future, a link to his private resource will be presented to him spontaneously each time that one of the spots that was proposed to him for the second page or pages, or that a close spot, is proposed to him for the current context of his browsing.

Thus, in the last two scenarios above, a link to the first page is presented to the user spontaneously each time that he visits pages in the domain of relevance covered by the spots proposed for the second pages[37].

[37] And insofar as the second pages were chosen by the user because according to him they are relevant with respect to the first page, and the relevance relation is transitive at this level, a link to the first page is presented to the user spontaneously each time he visits pages which according to him are in the domain of relevance of the first page!

Selecting the Spots

Before the spot(s) selection step proper, the system must obtain the set of "completed associated links" from the set of "given associated links" (which are given by the provider user, as described in the first scenario of use).

Completing the Associated Links:

The set of resources pointed at by the given associated links is the query R.

The calculation of the completed associated links is performed by means of the "relative distillation" method, comprising the following steps:

Step 1: Identify the set $R^-$ of resources which possess at least one link pointing at an element of R.

Step 2: Identify the set $R^{-+}$ of resources pointed at by the elements of $R^-$ (note that $R^{-+}$ includes R).

Step 3: For each resource of $R^{-+}$ calculate its authority score with respect to R. (This step can include the identification of a part of the resources of $R^{-+-}$ possessing a link pointing to a resource of $R^{-+}$)[38].

[38] The resources of $R^{-+}$ will start to be taken into account right from the first iteration, as described later.

Final step: Select the elements of $R^{-+}$ having the largest authority scores.

The calculation of the scores in step 3 may be performed by calculating, for each resource of $R^{-+}$, the ratio between the cardinality of the set of resources which point to it AND to the resources of the query and the cardinality of the set of resources which point to it OR to the resources of the query (or by means of one of the more complete equations described later, see in particular the equation for the quantity of common reasons—or homogeneity of a set of resources).

The authority scores are normalized (in such a manner that their sum becomes equal to 1).

The authority scores having been obtained, they can be put to use to allocate hub scores to the elements of $R^-$:

Step 4: The hub score of each element of $R^-$ is obtained by taking the sum of the authority scores (calculated in step 3) of the elements of $R^{-+}$ to which it points. The hub scores are normalized (in such a way that their sum becomes equal to 1).

Iteration restarting from step 3: the hub scores having been obtained, they can be put to use to sharpen the calculation of the authority scores. Step 3 then takes account of the hub scores so as not to consider all the elements of $R^-$ on an equal footing (the resources of $R^-$ pointing to resources having a higher authority score will thus have a greater influence). The cardinalities used to calculate the authority scores are thus replaced by weighted cardinalities. That is to say each hub resource, instead of counting for one, counts proportionately to its hub score. (The equations are detailed later.)

Step 3 then includes the taking into account of the resources of $R^{-+-}$ pointing to the resources of $R^{-+}$ having the largest authority scores, in addition to $R^-$ (a method optimizing the way in which $R^{-+-}$ is taken into account is described later).

After step 3, we can optionally perform step 4 again, and so on and so forth until convergence, that is to say until the difference between the results obtained in the last iteration and those obtained in the previous iteration are negligible (in general, fewer than 10 iterations are sufficient).

Variant for step 2: to form $R^{-+}$, instead of taking all the links contained in the resources $R^-$ the system will take only the links located in the relevant regions of the resources of $R^-$. As these relevant regions can be determined only onward of the moment at which the hub scores of the links that they contain are known, this variant will be implemented only onward of the first iteration, that is to say after having performed step 4 the system will iterate restarting from step 2 rather than from step 3.

Variant for Step 3:

With each link possessed by a resource of $R^-$ (or of $R^{-+-}$) is associated a weight equal to the complement of the closeness of the two resources connected by this link. Thus, the links connecting two close resources will be weakened. Thus the importance of the links between the resources which mutually promote one another (for example because it form part of one and the same web site and mutually cite one another) is thus decreased. Once the links are thus weighted, the system calculates the authority scores, not now by using the sum of the hub scores, but the sum of the hub scores multiplied by their weights (this is detailed and illustrated by an example later).

The closeness of the two resources connected by the link in question is obtained by calculating the ratio between the cardinality of the set of resources which point to the two connected resources and the cardinality of the set of resources which point to at least one of the connected resources.

(or by means in particular of one of the more complete equations described later).

It is also advantageous to perform the same algorithm downstream, that is to say by calculating the hub scores of the resources of $R^{+-}$ (which downstream cite the same resources as the query).

The downstream algorithms are identical to those upstream except that B (backward) is replaced by F (forward) and vice versa[39], and $^-$ is interchanged with $^+$ (e.g. $R^{-+}$ is replaced by $R^{+-}$).

[39] $B(R_i)$ is the set of URIs of the pages having a link to the page $R_i$. $F(R_i)$ is the set of URIs of the pages to which $R_i$ has a link.

Consideration will also be given, advantageously, to the hub resources upstream and the authority resources downstream, in such a way that the hub pages in step m1-1 and the authority pages in step m1-1' also acquire relevance scores (hub scores and authority scores respectively) and may thus be included in the resulting set provided at step m1-2 (in addition to the URIs of the pages of $R^{-+}$ and/or of $R^{+-}$).

By completing the associated links of each new query (spot) introduced, the system forms an inverse memory able to provide, for each potential current resource corresponding to an associated link, the most relevant queries (that is to say the most relevant spots).

Stated otherwise, the associative storage now comprises the following steps:

(Step m0 is performed independently of the other steps. Step m1 is performed only for the queries, not already known by the system or not sufficiently fresh, introduced by a provider user, while step m2 is performed for each use of a query (that is to say of a spot) as associative storage medium by a provider user or an end user.)

Step m0: store (in a third memory) the usage rights for spots for each user.

Step m1:

Step m1-1 corresponds to completing the associated links as described hereinabove.

Step m1-2: store, in a second memory, the URIs of the resources having a sufficient relevance score with respect to R, in relation to R, in such a way that on the basis of the URI of each of said resources having a sufficient relevance score with respect to R it is possible to retrieve[40] R as well as said sufficient relevance score;

[40] (From among the set of queries stored, as appropriate, for this resource)

Step m2: (in parallel with step m1) store in a first memory, for each user and query, the added links (to first resources);

During access to a current resource by a user:

Step b-m: Select from the second memory a certain number of queries, from among the queries (spots) (indicated in the first memory) that said user has the right to use, for which the relevance scores of said current resource are the highest (if they exist) and for which the relevance scores of the associated links are the closest to the contextual relevance scores for said user;

Step c: Retrieve from the first memory the links added by said user on the queries selected in step b-m, as well as the links added by their creators (if they are different from said user), and present them to said user, with optionally:

the (or a certain number of the) queries on which they have been added, as well as a certain number of (associated links to) resources having a sufficient estimated (in step m1-2) relevance score with respect to said queries selected in step b-m.

The relative distillation method will now be detailed.

The essential idea of the calculation of the relevance score (of a web page $P_2$ with respect to a given web page $P_1$) is as follows[41]:

[41] Hereafter, we shall assume that $P_1$ and $P_2$, (or $P_i$, $P_j$, etc) are web pages, although the methods described are far more general, as has already been mentioned. For example, it should be noted that instead of utilizing the hypertext links and the queries as mentioned hereinabove, the system may be based on analysis of the traces of the cutting and pasting of information fragments performed by the users (within the framework of creating and manipulating information resources), so as to automatically suggest other fragments which might enrich these resources. These traces may in fact be likened to links. For example, when part of a web page is copied into a document, the system is capable of deducing therefrom and of storing the existence in the document of a link to the web page, and the same mechanisms described here may then be applied. Moreover, the method described here may advantageously be applied by likening the links from one resource to another resource, to links from a user to a resource that he likes (that is to say to a resource which interests him). It is thus possible to determine the quantity of common reasons (between several resources) to be liked by users. This can in particular serve to categorize these resources.

Let $p_1$ be the probability[42] that a random author (of a web page) places a link on $P_1$ in a page.

[42] The probability of being interested in a (or certain) page(s) is approximated by counting the number of pages which have a link on it (them) and by dividing this number by an estimate of the number of pages which could have had one.

Let $p_2$ be the probability that a random author places a link on $P_2$ in a page.

Let $p_{1\&2}$ be the probability that a random author places a link on $P_1$ and a link on $P_2$ in a page.

$B(P_i)$ is the set of URIs of the pages having a link to the page $P_i$.

$F(P_i)$ is the set of URIs of the pages to which $P_i$ has a link.

The relevance of a page with respect to a set of pages may be defined by the "quantity of common reasons" to be interested in all these pages.

Algebraic calculations make it possible to obtain equations giving the quantity of common reasons between several pages. This quantity (or closeness, or else homogeneity) is denoted x, subscripted with the pages concerned; the probability of being linked to a certain page $P_i$ is denoted $p_i$; the probability of being linked to at least one page out of $P_i, P_j, \ldots, P_n$ is denoted $p_{ij} \ldots n$:

$$\overline{x_{ij}} = \frac{\overline{p_i} \cdot \overline{p_j}}{\overline{p_e} \cdot \overline{p_{ij}}}, \quad \overline{x_{ijk}} = \frac{\overline{p_i} \cdot \overline{p_j} \cdot \overline{p_k} \cdot \overline{p_{ijk}}}{\overline{p_e} \cdot \overline{p_{ij}} \cdot \overline{p_{ik}} \cdot \overline{p_{jk}}},$$

and so on and so forth (all the subsets of odd size in the numerator, and the others in the denominator)[43].

[43] The bars above indicate complements, and $p_\varnothing$, the probability of liking at least one page of an empty set, is a constant equal to zero; it is present in the equation for reasons of consistency.

This equation may be denoted more compactly thus:

$$\overline{x_S} = \prod_{P \subset S} \overline{p_P}^{\sigma_P} \text{ with } \sigma_P = (-1)^{|P|}.$$

The probabilities concerned above involve the number (the count) of pages of $R^-$ which contain a given link or a link from among a set of given URIs (to pages of $R^{-+}$). It would be beneficial to weight this number by the quality of citation (hub score, described later) of each page which contains such a link.

It would thus be desirable for a page of $R^-$ citing more better pages (of $R^{-+}$) to be regarded as being of better quality of citation, and for in return a higher weight to be given to it within the framework of the calculation of the scores[44] of the pages that it cites ($R^{-+}$), the scores of the pages of $R^-$ and those of the pages of $R^{-+}$ mutually influencing one another in an iterative approach (bipartite reinforcement) which converges[45].

[44] Recall that here one is dealing with relevance scores with respect to the query, in contradistinction to the state of the art which makes it possible to determine a score of quality "in the absolute".
[45] Note that the calculation of the relevance score of a page of $R^{-+}$ may result in a negative value (that we will then neutralize; this is described later). Specifically, certain pages may not only be close to the query, but even be antagonistic with respect to it (the fact of being of interest thereto decreases the chances of liking the pages of the query and vice versa).

The number of pages of $R^{-+-}$ citing each candidate page (that is to say of $R^{-+}$) also comes into the calculations. However, it is expensive to take them into account.

Hence, the results will be approximated by considering only those which cite the candidate pages having a good score, this score being calculated firstly by considering only $R^-$ and subsequently by extending this set to $R^{-+-}$ gradually. To calculate the relevance score of a candidate page, instead of taking the result of the equation for the quantity of reasons directly, it is preferable to take it together with the overall cardinalities replaced by the total of the hub scores of the pages in question and
to multiply this result by the authority score of the candidate page (simply calculated on the basis of the total of the hub scores of the citing pages), so as thus to weaken the pages which are relatively less reliable (being less popular as they are).

After a first iteration, in the citing pages the system can
label the regions containing directed links on pages of $R^{-+}$ having a good score
and already begin to prune the links which are not situated in these regions.

As the links in question are located under nodes of a typically tree-like document structure (such as in HTML in particular), to determine a relevance region it suffices to take the (minimal) nodes which encompass all the good links and to take away from them the (maximal) subnodes which contain a bad link (score too low, or URI explicitly refused) and which contain no good link (sufficient score). The algorithm makes it possible, having a homogeneous set (having sufficient homogeneity) of URIs associated with close pages, to obtain a list of URIs of pages which are relevant in regard to this set. The way in which this algorithm may be utilized to obtain a set of relevant pages for an inhomogeneous set will be described later.

As input, this algorithm takes
a set K of reference URIs ("Kernel")
a set A of candidate URIs ("Authority")
a set H of hub candidate URIs
a set T of URIs to be refused ("Trash")
We have: $K^- \subset H \subset A^-$ and $T \cap K = \varnothing$. (E being a set of URIs, $$E^- = E^- = \bigcup_{P_i \in E} B(P_i) \text{ and } E^+ = \bigcup_{P_i \in E} F(P_i))$$

1. With each page $P_i$ of H, associate a number $h_i$, initially set to $$\frac{1}{|H|},$$

its hub score[46].

[46] Thus, advantageously, the sum of the $|H|$ scores $h_i$ is equal to 1.

2. (Re)calculate the authority scores:
   a. For each page $P_i$ of A, beginning with those of K, associate a number $a_i$, its authority score, equal to $$\sum_j l_{ji} \cdot h_j, \text{ where } l_{ji} = \begin{cases} 0 & \text{if there is no link between } P_j \text{ and } P_i \\ 1 & \text{if there is a link between } P_j \text{ and } P_i. \end{cases}$$

b. A possible but dangerous optimization: if, for certain pages, $a_i$ is sufficiently close to its value calculated previously (as appropriate), and if the authority scores of the pages of K have not varied either, we can keep the old value of $r_i$ for this page, to save on calculations.

3. (Re)calculate the relevance scores:
   a. For each page $P_i$ of A calculate $r_i^+$, equal to $W_{i \cup K}$ $$r_i^+ = W_{i \cup K}$$

and in the case where the result is negative (case of a page antagonistic to R) neutralize the incoming links in such a way as to have $r_i^+ = 0$.

The upstream homogeneity $w_S$ of a set S is defined as follows:

$$\overline{w_S} = \prod_{P \subset S} \overline{a_P}^{\sigma_P}, \text{ where}$$

$\sigma_P$
- 1 if P contains an even number of pages
- +1 otherwise $a_p = \Delta_i h_j l_{jp}$ where $\Delta$ is an arbitrary constant less than but close to 1 (it serves to avoid divisions by zero but does not change the principle of the algorithm. If the set H is larger than $K^-$ then this constant may be equal to one $$l_{jp} = \begin{cases} +1 & \text{if } \exists P_j \lfloor P \rfloor l_{ji} = +1 \\ 0 & \text{otherwise} \end{cases}$$

with $l_{ji} = \begin{cases} 0 & \text{if there is no link between } P_j \text{ and } P_i \\ 1 & \text{if there is a link between } P_j \text{ and } P_i \end{cases}$ Stated otherwise, $l_{jP}$ is equal to 1 if there is a link
from a page $P_j$ (of H)
to at least one page $P_i$ of P and zero otherwise.

This signifies quite simply that $a_p$ is the total of the hub scores of the pages (of H) which point at at least one page of P (P being the current subset of S which is considered).

For each existing link $l_{ji}$, it is possible to associate with it a weight as a function of the closeness of the pages $P_i$ and $P_j$ and thus to improve the result—see later.

Here, since $\forall P_i \epsilon K$ we have $r_i^+ = W_K$ (the relevance is the same for all the pages $P_i$ of K), the relevance score $r_i^+$ has to be calculated only once for the pages of K (besides, it will already be calculated during the procedure for chopping the query R into subqueries (kernels) K, and will therefore already be known on entry to the procedure).

b. (This point will be skipped the first time). To have their sum equal to 1, we must divide each $r_i^+$ by the sum $\Sigma |r_i^+|$ of all the absolute values of the $r_i^+$.

Let $$\delta = \sum_i \left| r_i - \frac{r_i^+}{\sum_i |r_i^+|} \right|$$

be the global variation of the relevance score.

If $\delta < \epsilon (\epsilon > 0$ being a margin of error) we assume convergence has occurred and the method stops. Otherwise, the method continues.

c. We replace $r_i$ by $$\frac{r_i^+}{\sum_i |r_i^+|}$$

$$r_i \mapsto \frac{r_i^+}{\sum_i |r_i^+|}$$

a friction factor $\tau$ also being able to be used:

$$r_i \mapsto \tau r_i + \overline{\tau} \frac{r_i^+}{\sum_i |r_i^+|} \cdot (\tau \in [0; 1[,$$

we shall preferably take a very small value e.g. 0.01 so that in cases where this is not necessary the number of iterations does not change).

4. [47] For each page $P_i$ of H:

[47] This point may possibly be ignored after the first time.

a. Find all the links which point at a page having a relevance score larger than a threshold epsilon to be chosen ($\epsilon > 0$).
  b. Find $I_i$, the smallest HTML element[48] containing all of the links found in point a above.

[48] (Or other analogous representation . . . )

c. For each link pointing at a page of T (if T is not empty), find the largest HTML element containing it (if there is one) and not containing any link found in point a. above, and remove it from $I_i$.
  d. We keep all the links remaining in $I_i$ and we delete the others (or else we neutralize them by setting their $l_{ij}$ to zero).

5. Recalculate the hub scores:
  a. For each page $P_i$ of H, calculate $h_i^+ l_{ij} r_j$, the sum of the relevance scores of the pages pointed at.
  b.

$$h_i \mapsto \frac{h_i^+}{\sum |h_i^+|}$$

(The division by $\Sigma |h_i^+|$ is, as for the relevance score, so as to keep their sum equal to 1).

Then return to point 2.

Initially, so as to process only a reduced number of pages, the relevance scores may be calculated on the basis of $R^-$ (if we took $H = R^-$). Hence, this will only be an approximation. Specifically, for the scores to be correct, they have to be calculated based rather on $H = R^{-+-}$. However, as the construction of $R^{-+-}$ is relatively expensive, we shall take only a subset: for $R^{-+-}$ we shall take only the pages pointing at the pages of A which have a good score.

Thus[49], a subset will be added before the end of step 2.a:

[49] Several procedures may be used; here we present the preferred one.

2.a.1. In the case where the score $r_i^+$ of the current page ($P_i$ of A) is sufficient[50], $r_i^+$ is recalculated after having inserted the new pages of $B(P_i)$ into H.

[50] (That is to say greater than a chosen threshold; this threshold can be dependent on the current cardinality of H, specifically, the closer we get to $R^{-+-}$ (e.g. $H_{final}$), the more chance the calculated score has of being correct)

$$H| \rightarrow B(P_i) \cup H$$

We introduce an authority score for the pages of A and the equation $r_i^+$ is $r = w_{i \cup K} \cdot a_i$ (rather than $r = w_{i \cup K}$). The new coefficient $a_i$ will make it possible to weaken the pages that are not very reliable (because they are not very popular). Furthermore, the equation will be more consistent insofar as the relevance score will no longer be the same for all the pages of the query.

The procedure is now as follows:
1. This point is the same as that of the algorithm for calculating relevance scores presented above.
2. This point does not change either.

3. (Re)calculate the relevance scores:
   a. For each page $P_i$ of A calculate $r_i^+$, equal to $w_{i \cup K} \cdot a_i$ and in the case where the result is negative (case of a page antagonistic to R) neutralize the incoming links so as to have $r_i^+ = 0$.
   b. Resume from point 3.b of the previously presented algorithm for calculating relevance scores.

Filtering:

For each existing link $l_{ji}$, it is possible to associate therewith a weight dependent on the closeness of the pages $P_i$ and $P_j$ and to thus improve the result. This makes it possible to decrease the importance of the links between pages which mutually promote one another. Typically one thus succeeds in filtering for example the links of the "abstracts" and other "menus" which, repeatedly, are located in all the pages of a site.

The basic idea consists in weakening the links connecting two pages that we know to be close, by assigning a weight to each link, which weight will be equal to the complement of the closeness of the two connected pages (the greater the closeness, the more the link must be weakened). Once the links have thus been weighted, it is possible to calculate the homogeneity of a set of pages using the sum of their weights, rather than the number of citing pages.

In point 3.a of the algorithm, in the definition of the authority score we replace $$_jh_jl_{jP} \text{ with } _jh_jl_{jP} \text{ where } l_{jP} = \min_{P_i \lfloor P} 1; \max(l_{ji} ? \overline{x_{ji}})$$

Explanations:
$l_{ji} ? \overline{x_{ji}}$ is the complement of the closeness between page $P_j$ and page $P_i$ if there is a link from page $P_j$ to page $P_i$, and zero otherwise $$\max_{P_i \lfloor P}(l_{ji} ? \overline{x_{ji}})$$

is the complement of the closeness between page $P_j \in H$ in question and page $P_i \in P$ for which the link between $P_j$ and $P_i$ exhibits the minimum closeness $$\min_{P_i \lfloor P} 1; \max(l_{ji} ? \overline{x_{ji}})$$

signifies that this value is truncated above to 1

$$\text{and always } l_{ij} = \begin{cases} 0 & \text{if there is no link between } P_j \text{ and } P_i \\ 1 & \text{if there is a link between } P_j \text{ and } P_i \end{cases}$$

Stated otherwise, if there is at least one link
from the page $P_j$ (of H) in question
to a page $P_i$ of P, $l_{jP}$ is equal to the complement of the closeness between page $P_j$ and page $P_i$ which is the least close to it and to which it possesses a link. $_jl_{jP}$ is the sum of the weights thus associated with the pages of H which point at at least one of the pages of the subset P considered.

To determine the closeness $x_{ji}$, we can take the equation (already described) for the quantity of common reasons:

$$\overline{x_{AB}} = \frac{\overline{p_A} \cdot \overline{p_B}}{\overline{p_\emptyset} \cdot \overline{p_{AB}}}$$

Figure 6:
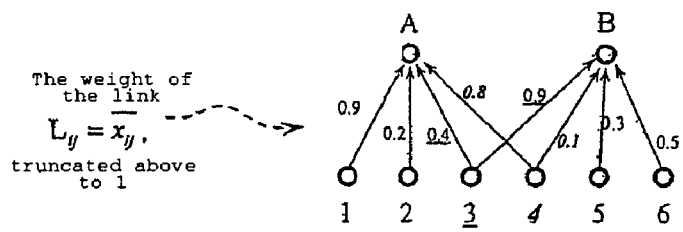

FIG. 6 presents an example where the number of pages pointing at page A is equal to 0.9+0.2+0.4+0.8=2.3

The number of pages pointing at page B is equal to 0.9+0.1+0.3+0.5=1.8

The number of pages pointing at A or B ($Np_{AB}$) is equal to 0.9+0.2+0.9+0.8+0.3+0.5=3.6

Thus, if we assume that $|H|+h=100$, the calculation of the closeness of A and B gives:

$$\overline{x_{AB}} = \frac{\overline{p_A} \cdot \overline{p_B}}{\overline{p_\emptyset} \cdot \overline{p_{AB}}} = \frac{0.977 \cdot 0.982}{1 \cdot 0.964}, \text{ this giving}$$

$$\tilde{x}_{AB} = \frac{x_{AB}}{p_B} \approx 0.264 = 26.4\%.$$

The filtering described above uses a weight $\overline{x_{ji}}$. Since we now have the scores[51] of the citing pages, we can optionally improve the method by taking $$\overline{x_{ij} ? \overline{h_j}}$$

as weight (instead of $\overline{x_{ji}}$), where $h_j$ is the score of the citing page (weakening a link) (from a citing page $P_j$ to a cited page $P_i$) further when the score of the citing page $P_j$ is low.

[51] (Whether absolute or with respect to the query)

It should be noted that in order to calculate the closeness $x_{ji}$ between two connected pages $P_i$ and $P_j$, instead of using the equation for the quantity of reasons as illustrated hereinabove, it is possible to calculate the ratio between:
   the cardinality of the set of pages which point to $P_i$ AND $P_j$ and the cardinality of the set of pages which point to $P_i$ OR $P_i$.

Determination of the Homogeneous Subsets of a Query:

We provide the system with a set R of pages and possibly a set of pages $R_x$ of pages that we do not explicitly want ($R \cap R_x = \emptyset$). The system will identify within R at least one group of "homogeneous" pages and will launch a separate sub-query on this or each group. These groups are called "kernel". To form the response, we shall then take a combination of the scores obtained. This method thus comprises the following steps:
1. For each page $P_i$ of R, find $B(P_i)$, the set of pages citing $P_i$.
2. Find $$R^- = \bigcup_{P_i ?, R} B(P_i),$$

the set of pages citing at least one page of R.

3. In the pages of R which are not yet in a kernel (at the start none is), find the page $P_B$ having the largest set $B(P_B)$ of incoming links[52] and create a kernel containing only this page. This kernel is now $K_C$, the current kernel under construction (at any instant there is just one of them). If all the pages were located in at least one kernel then go to point six.

[52] In the case where we have the authority scores of the pages, or some other popularity score, we prefer in fact to base ourselves on them.

4. Find the relevant pages with respect to $K_C$ (using the algorithm for calculating relevance scores) with
   H=R⁻
   A=R
   K=$K_C$
   T=$R_X$
5. Let $P_N$ be the page of R, not yet in $K_C$, which has the highest relevance score. If its relevance score is less than a fixed minimum score, return to point 3. (The current kernel is now complete). Otherwise insert it into $K_C$ and go back to point four. It should be noted that it will not be necessary to reinitialize the hub and authority scores, it is preferable to keep the latest values calculated, thus the convergence ought to be very fast.
6. We now have a set of kernels (upstream homogeneous sub-queries) ready to be used as described in this document. When we want to calculate the relevance scores globally to the whole query we calculate an arithmetic average of the results for each of the kernels.

homogeneity equation

As a variant, instead of basing ourselves on the homogeneity equation $$\overline{x_S} = \prod_{P \subset S} \overline{p}_P^{(-1)^{|P|}}$$

as described hitherto, the relevance scores calculation example method can be based on another homogeneity equation, such as for $$x_S = \frac{\left|\bigcap_{P_i \in S} B(P_i)\right|}{\left|\bigcup_{P_i \in S} B(P_i)\right|} O \text{ or else } x_S = \frac{\left|\bigcap_{P_i \in S} B(P_i)\right|}{\left|\bigcup_{P_i \in S} B(P_i)\right|} \cdot \left(\frac{\overline{\text{Min}|B(P_i)|}}{\overline{\text{Max}|B(P_i)|}}\right)$$

in which the ensemble cardinalities (represented between vertical bars) are replaced by the total of the hub scores of the pages in question[53].

[53] We can say that the cardinalities are replaced by "weighted cardinalities", the weights being the hub scores.

Downstream Processing:

Instead of searching for the good pages in relation to those of a kernel from among the pages that are cited in common with them it may be beneficial to perform the same algorithms in the other direction, i.e. by searching among the pages which cite the same pages as the kernel, or even to perform both and to calculate an arithmetic average.

The downstream algorithms are identical to those upstream except that B is replaced by F and F is replaced by B, and ⁻ is interchanged with ⁺ (for example R⁻⁺ is replaced by R⁺⁻).

The upstream and downstream methods may advantageously be integrated in the following manner: after the upstream processing (possibly even after each upstream iteration), with the candidate pages (R⁻⁺) having obtained a sufficient relevance score, we associate downstream a set of extra pages ("artificial pages") whose cardinality is dependent on said relevance score. Each artificial page is also cited by (at least) one page of the query. The scores of these good pages (of R⁻⁺) found upstream[54] are thus given downstream an "advantage", and consequently the scores of the pages (of R⁺⁻⁺) cited as appropriate by these good pages are also indirectly given an advantage.

[54] Note that, advantageously, this is done without amalgamating the relevance scores upstream and downstream.

And conversely, after the downstream processing (possibly even after each downstream iteration), the same method is applied symmetrically upstream. Thus the good pages of R⁺⁻ are favored, as are indirectly the pages (of R⁻⁺⁻) which cite them, as appropriate.

By not amalgamating the scores upstream (of the pages R⁻⁺) with the scores downstream (pages R⁺⁻) it is possible to dissociate them in the calculations. In particular, the influence of the scores obtained downstream can be decreased in the upstream processing or vice versa.

Moreover, by virtue of this idea of "artificial pages", the present method may be applied as a complement to the existing procedures of the prior art. Specifically, once the scores have been obtained for each page, the respective numbers of citing and cited pages can be modified artificially before applying these procedures.

It is possible to trek (known as "crawling") the web by following the links (upstream and downstream) around the previously cited pages of the 7 sets, exploiting the addition of the artificial pages to advantage the web pages linked to the pages which are more relevant with respect to the query.

Insofar as the pages having the best scores are presumed to be relevant to the user (and insofar as the relevance is transitive), the methods described here will be able to be applied recursively thereto to discover yet other relevant pages. It is thus possible to trek the web based on the user's query.

Figure 7:
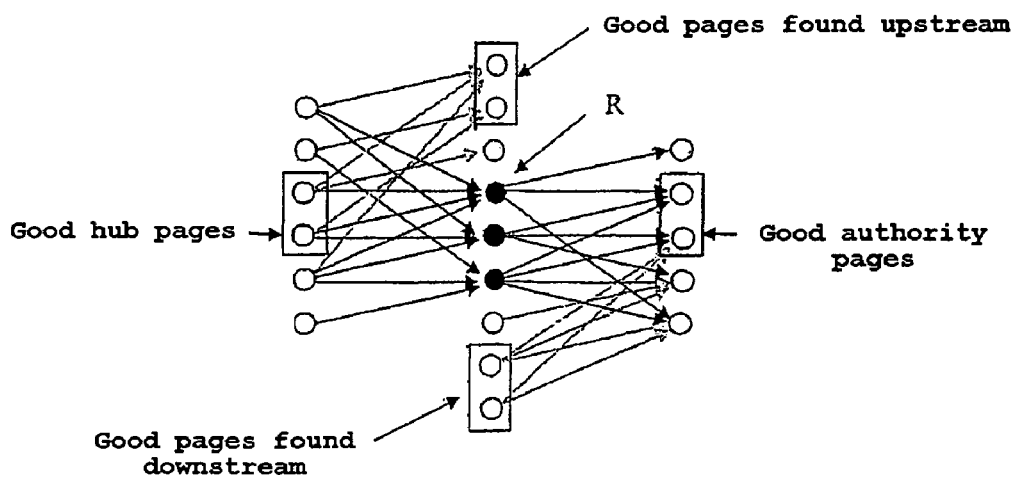

FIG. 7 diagrammatically presents such a method: the search for relevant pages can be applied recursively by extending the query with the "good pages found upstream", "good pages found downstream", "good hub pages" and "good authority pages" which in the figure are framed by rectangles. At each recursion, the scores of the best pages found become slightly lower (because each time the best pages found are added into the query) and the method stops when the scores cease to be sufficient.

A system implementing the relative distillation method described hereinabove is able to receive a search query composed of a set of URIs making it possible to access information resources such as web pages and to provide in response the URIs (or directly the pages) which are presumed to be the most relevant with respect to said query.

The query being composed for example of the favorite links of the user and the goal of the system being for example to monitor the web around these links and to notify the user when new interesting pages appear therein, either by "Push" technology at the initiative of a server, or by "Pull" technology at the initiative of the user.

The user can of course provide the system directly with a set of URIs, nevertheless, other means may also be offered to him to assist him in the preparation and submission of a search query.

To trigger the execution of a search query from a hypertext link located in a page, the user can use any one of the devices from among the following:

A graphical object activatable for example by clicking (e.g. a button), is presented close to certain hypertext links (URI) in a web page. Its activation triggers the sending of a search query containing the URI in question.

The system is furnished with a means able to toggle the page into a state where each click on a link triggers the execution of a search query (containing this link).

A key of the keyboard, such as the "Ctrl" key, pressed while clicking (by a means of pointing) serves to trigger the execution of a search query from the link on which cursor of the pointing means is positioned.

The right-hand mouse button (or equivalent) serves to trigger the execution of a search query from the link on which the cursor of the mouse is positioned.

Other analogous device.

Each of these devices can advantageously make it possible to execute said search query in addition to (in parallel with) access to the page designated by the link in question. The result of the search query will for example be displayed in a second window (new instance of the browser) or else in a subwindow of the browser[55].

[55] In a manner analogous to the subwindow existing today for favorites, this subwindow may be adjacent to the main subwindow in which the page containing the link that the user has clicked was displayed and in which the page accessed by the act of clicking on this link is subsequently displayed.

As a supplement to the link selected, other URIs may be added routinely into the search query[56]. They may in particular be:

[56] Specifically, one of the essential advantages of the system is to be able to operate (find the relevant information resources) even if the search query is composed of a plurality of URIs.

- the links located in the page, in the region of the URI selected;
- the URIs previously selected by the user for this same query in the course of his browsing[57];

[57] The new URIs found by the system are then highlighted in the result returned to the user (to distinguish them from the URIs which had already been returned in the same browsing).

- links explicitly envisaged and preferably determined by the designer of the page to accompany the URI selected;
- the URIs that another user ("mentor" or referent) considers to be very relevant with respect to the URI selected, the mentor being determined automatically by the system, or specified by the user himself (chosen from a list of "pals" that he has previously stored in the system), or else proposed by the page designer (the user can also choose from a list of "experts" proposed by the page designer).

Preparation of a Query:

We shall now describe how the user can prepare a query composed of several links that he gleans in the course of his browsing.

a) Displaying of the Current Query Under Preparation

Instead of triggering a search query directly, the user's action (as described above, for example the act of clicking on a link with the right-hand button and choosing the appropriate option) triggers the displaying of an accessory page in which:

- in addition to the link that the user wishes to select[58], other links, that he has, as appropriate, previously selected for this same query, are presented;

[58] (As well as the links added routinely, as appropriate, as described hereinabove)

- boxes to be ticked may be displayed in association with each link presented, in such a way that the user can in particular select those links that will actually form the query;
- said accessory page is also furnished with an input means (such as a button) making it possible to launch the search query.

Thus the user can prepare a query gradually, by selecting links one after the other[59] during his browsing[60] and thereafter send a query composed of several URIs.

[59] (In one and the same page or in different pages)
[60] (During one and the same browsing or staggered over time)

Said accessory page may additionally contain drop-down graphical objects (such as for example directories, records, folders, or similar metaphor) representing queries under preparation other than the query in progress. The user can thus choose the query or queries which will be enriched by the new link that he has just selected.

Following the preparation of a query from a URI corresponding to a hypertext link in a page (as described above), the already existing queries which, as appropriate, contain this URI are optionally presented to him.

Advantageously, said accessory page may be composed of two parts. One of these parts contains the elements described hereinabove (that is to say the elements of the query under preparation). The other part presents the content of the page designated by the link selected by the user.

For example, if the user clicks on a link while the page is in the state where all clicks trigger the displaying of the current query under preparation (or with the right-hand button of the mouse, etc.), the server returns said accessory page to it, which thus comprises:

- in one part: the elements of the query under preparation
- and in the other part: the content of the page designated by the link clicked.

Thus, the use of the system represents an important advantage with respect to conventional browsing around the web: the user receives not only the page designated by the link that he has clicked (this is conventional web browsing), but at the same time he benefits from the possibility of sending a query (containing several URIs) to obtain yet other resources relevant in relation to this page.

As a variant, said accessory page is returned after fast (or even restricted[61]) execution of the search query in the course of which the link clicked was added.

[61] In the case of a query regarding pages already crawled, the system can directly return the relevant URIs (or pages) already known and return the rest of the results later on.

The second page then directly contains a part of the result[62]. The user then receives not only the page designated by the link that he has clicked, but in addition he benefits directly from other resources relevant in relation to this page.

[62] (For example in the form of a list of URIs or a set of vignettes representing these pages in miniature)

More advantageously still, said accessory page may be displayed in a subwindow[63] adjacent to the main subwindow of the browser. This adjacent subwindow opens in response to the action of the user who desires the displaying of the query under preparation (that is to say said accessory page).[64]

[63] (Analogous to the favorites subwindow of the current browsers)
[64] Note that, in parallel with the displaying of the query under preparation, the server can advantageously already begin to trek the web (crawling)—that is to say construct $R^-$, $R^{-+}$, $R^{-+-}$, $R^+$, $R^{+-}$ and $R^{+-+}$ as already described—around the link selected.

The query under preparation can thus be displayed in parallel (asynchronously) with the displaying of the page designated by the link clicked; the latter page being displayed (independently) in the main subwindow.

The result of the search query can thereafter be presented in the same adjacent subwindow.

As mentioned previously, a (partial) result may possibly be returned after partial or restricted execution of the search query in progress, to which query the link clicked was added. The adjacent subwindow then directly presents a fast search result (which will possibly be supplemented subsequently).

b) Result of the Execution of a Search Query

For each search query, the server can return the results directly (for example returned from the HTTP query) or later on (for example by email).

The server returns the URIs (resulting from a query) in a page exhibiting the same structure as said accessory page (or said query under preparation), namely:

boxes to be ticked are associated with the links in such a way that the user can select those links that he likes and delete those he does not like[65]

[65] (That is to say ask the system to no longer suggest them)

each URI[66] can thus be in at least one of the following states[67]: suggested (default state), accepted or deleted (the URIs that are in the deleted state are not presented);

[66] Optionally, the presentation of the result of a search query includes the content of the pages (that are pointed at by the resulting URIs) for example in miniaturized form (vignettes).

[67] Subsidiarially, an option to copy ("freeze") a page (locally or in a personal space on a server) may also be offered to the user. Each link can then be in one of the following states: suggested, accepted, deleted or frozen.

the page is furnished with an input means (such as a button) making it possible to relaunch the search query.

The page returned also presents the other queries (from the same user) in the form of drop-down graphical objects, as already described. Their presentation may be hierarchized according to their relevance with respect to the link clicked (according to the relevance calculation methods described later).

The page returned presents means of control allowing the user to create new queries and to delete existing queries. Of course, the user can cut and paste URIs from existing queries or from any other resource. Also, when the result of a query is returned by the server, the user can shift (hive off) the URIs received into other queries. Each query is individually accessible by means of its own URI.

Maintaining the Spots

Described hitherto are several methods that use the relative distillation procedure, starting from a query (e.g. the given associated links of a spot) composed of a set of URIs, to determine and store relevant URIs (e.g. the completed associated links of a spot) with respect to this query, together with their relevance scores. These stored results are obtained on the basis of counting links located in the resources of the sets $R^{-+}$, $R^{-+-}$, $R^{+-}$, $R^{+--}$, $R^{+-+}$, $R^{+-+-}$[68] etc. which are themselves stored at least in part. Now, these sets vary over time (and the links located in the resources constituting these sets also vary). The stored data must therefore be kept up to date and the calculations must be redone when the data that they take as input vary significantly.

[68] $R^{-+-}$, $R^{+-}$, and $R^{+-+}$ are in particular used to calculate the closeness of linked resources, and to filter, as described above, by taking the complement of this closeness as weighting for the counting of the links in question.

Moreover, it is desirable to disclose new relevant resources even before links pointing to them appear on the web. A method making it possible to do so will now be described.

For each query (for example for each spot), select a first set of resources having the largest relevance scores (such as the largest hub scores) for said request, determine the relevant regions (that is to say the regions possessing links to resources whose scores are high on average) of said first set of resources having the largest relevance scores, monitor the new links which appear in said relevant regions and which point to new resources (that is to say to resources that were not yet known to the system), select a second set of resources having a high relevance score (such as the authority score) for said query, select the new resources which are the most similar to the resources of said second set of resources and give the new resources selected a time-dependent authority score (as described hereinbelow) as a function of their similarity to the resources of said second set of resources.

The similarity of a resource with respect to other resources is determined by comparing their contents. Described hereinbelow is the way to determine the similarity as a function of the distribution of the words in the resources in question.

Time-Dependent Authority Score:

Each new authority resource has a hypertext authority score ($a_{ht}$) and a similarity authority score ($a_s$). Let $\tau$ be the ratio between the time remaining in order for the resource in question to no longer be considered to be new and the total duration of newness (that is to say the total duration for which a resource which has just been discovered by the system is considered to be new). $\tau$ is therefore a number equal to 1 at the start of the life of a resource in the system, and decreases linearly until it reaches 0 at the moment at which the resource in question is said to be old.

Thus $\tau$ is used as a weighting to go gradually from a similarity score to a hypertext score and the formula for the global score is $$a = \tau a_s + \tau' a_{ht}$$

(with $\tau'=1-\tau$).

As the distribution of the words of a new resource varies in principle less than the hypertext links which point to it, $a_s$ is considered to be constant while $a_{ht}$ must be updated over time. Thus the score $a_s$ must be calculated at the moment at which the new resource is discovered, and for all the queries for which it is in a relevant region, until it becomes old (thus if a link to this resource appears in a relevant region after it has become old, then its similarity with the resources of said second set will not be determined).

Similarity:

An absolute distillation algorithm will be used to determine the score $a_s$ of each new resource.

The known method of absolute distillation over a set of nodes connected by links (thus forming an oriented graph) comprises the following steps:

1—allocate each node a hub score equal to 1 and an authority score,

2—for each node calculate its authority score by adding up the hub scores of the nodes which point to it, then normalize the authority scores in such a way that their total is equal to 1, 3—for each node calculate its hub score by adding up the authority scores of the nodes to which it points, then normalize the hub scores in such a way that their total is equal to 1, 4—reiterate by restarting from step 2 until the algorithm converges, that is to say until the scores are no longer significantly different with respect to the previous step.

In addition, here the links are weighted by the similarities of the resources in question with respect to the distribution of their words. Steps 2 and 3 are replaced by the following:

2'—for each node calculate its authority score by adding up the hub scores of the nodes which point to it, multiplied by the weight of the respective links, then normalize the authority scores in such a way that their total is equal to 1, 3'—for each node calculate its hub score by adding up the authority scores of the nodes to which it points, multiplied by the weights of the respective links, then normalize the hub scores in such a way that their total is equal to 1.

The weight of the similarity link between two resources is equal to the scalar product of their distributions of words (that is to say to the sum, for each word located in the two resources, of the product of the frequencies of this word in these resources; the resulting sum is a number between zero—case where there is no word in common—and 1—case where the two resources have the same content) after having removed the nonpertinent words ("stop words").

It should be noted that the similarity links thus obtained are bidirectional.

Thus, the absolute distillation can thus be performed over the set of resources comprising:
  the new resource discovered,
  and said second set of resources having high relevance scores, to determine the scores $a_s$ of this new resource discovered.

The methods described above also make it possible to select, from among a set of extra resources, a resource which is the most relevant with respect to a starting resource.

Accordingly, the following three steps are implemented:
(a) selection from the web of resources that are most similar to the starting resource (typically a private resource), by one of the procedures of the invention,
(b) selection from the web of resources that are the most relevant with respect to the resources selected in step (a), and
(c) selection of extra resources (typically of private resources again) that are the most similar to the most relevant resources selected in step (b).

Such a method makes it possible in particular to dynamically generate the content of web pages published as a function of context.

The invention claimed is:

1. A method for managing information resources in a computer system for the purpose of resource retrieval, said resources including a first resource to be retrieved and a second resource obtained independently from said first resource and having a potential relevance relationship with other resources based on a relevance scoring process, the method comprising:
  a) receiving user information from a user input device, said user information being representative of a declaration that said first resource is associated with said second resource for the purpose of being later retrieved, and storing information relative to this declaration;
  b) when selecting said second resource by a user input device:
    b1) based on said stored information, further displaying an indicator of the existence of said first resource,
  c) when selecting an other resource:
    c1) determining whether said other resource is relevant with respect to said second resource,
    c2) if step c1) has determined a relevance between said other resource and said second resource, based on said stored information, further displaying an indicator of the existence of said first resource,
  d) retrieving said first resource utilizing said indicator displayed when selecting said second resource or said other resource, wherein said first resource is retrievable although it initially had no connection with the second resource.

2. The method as claimed in claim 1, wherein said user information received in said step a) is representative of a declaration that said first resource is associated with several second resources, all said second resources being obtained independently from said first resource.

3. The method as claimed in claim 1, wherein said second resource comprises a group of resources, and wherein said relevance scoring process finds other resources based on an input including said group of resources.

4. The method as claimed in claim 3, wherein said group of resources comprises resources derived from a browsing context.

5. The method as claimed in claim 3, wherein said group of resources forms a spot of resources.

6. The method as claimed in claim 3, wherein said relevance scoring process comprises implementing a search engine based on the analysis of links between various resources based on an input query comprising a series of resource identifiers designating the resources of said group.

7. The method as claimed in claim 3, wherein said other resources belong to a plurality of resources forming a browsing context.

8. The method as claimed in claim 1, wherein said step c1) is performed by comparing a relevance score with a threshold.

9. The method as claimed in claim 1, wherein said step c1) is performed by using relevance data previously obtained by said relevance scoring process performed between said other resource and said second resource.

10. The method as claimed in claim 1, wherein said step c1) is performed by performing said relevance scoring process between said other resource and said other resource once said other resource has been selected.

11. The method as claimed in claim 1, wherein said indicator comprises a link to said first resource.

12. The method as claimed in claim 1, wherein said step a) comprises receiving information from said user input device which is a pointing input device, said information being representative of actions made with said pointing input device on displayed graphical objects representative of said first resource and said second resource.

13. The method as claimed in claim 1, wherein said step a) further comprises the storage in a user associative memory of information representative of an association between the first and second resources.

14. The method as claimed in claim 1, wherein said first resource is a personal file, and said second and other resources are web pages.

15. A method for managing information resources in a computer system for the purpose of resource retrieval,
  said resources including a first resource to be retrieved
  and a second resource obtained independently from said first resource and having a potential relevance relationship with other resources based on a relevance scoring process, the method comprising:
  a) receiving user information from a user input device, said user information being representative of a declaration that said first resource is associated with said second resource for the purpose of being later retrieved, and storing information relative to this declaration;
  b) when accessing said second resource by a user input device:
    b1) displaying said second resource,
    b2) based on said stored information, further displaying an indicator of the existence of said first resource, c) when accessing an other resource, by a user input device:
   c1) determining whether said other resource is relevant with respect to said second resource,
   c2) displaying said other resource, and
   c3) if step c1) has determined a relevance between said other resource and said second resource, based on said stored information, further displaying an indicator of the existence of said first resource,
d) retrieving said first resource utilizing said indicator displayed when accessing said second resource or said other resource, whereby said first resource is retrievable although it initially had no connection with the second resource.

16. The method as claimed in claim 15, wherein said user information received in said step a) is representative of a declaration that said first resource is associated with several second resources, all said second resources obtained independently from said first resource.

* * * * *

UNITED STATES PATENT AND TRADEMARK OFFICE
CERTIFICATE OF CORRECTION

PATENT NO. : 7,676,507 B2  
APPLICATION NO. : 10/501494  
DATED : March 9, 2010  
INVENTOR(S) : Enrico Maim It is certified that error appears in the above-identified patent and that said Letters Patent is hereby corrected as shown below:

In claim 7: delete "claim 3" and replace with "claim 1".

In claim 7: delete "resources belong" and replace with "resource belongs".

In claim 7: insert --relevant-- before the term "browsing".

In claim 10: delete the second instance of "other" in line 33 and replace with "second".

Signed and Sealed this

Fourteenth Day of September, 2010

David J. Kappos  
*Director of the United States Patent and Trademark Office*

UNITED STATES PATENT AND TRADEMARK OFFICE
CERTIFICATE OF CORRECTION

PATENT NO. : 7,676,507 B2  Page 1 of 1
APPLICATION NO. : 10/501494
DATED : March 9, 2010
INVENTOR(S) : Enrico Maim It is certified that error appears in the above-identified patent and that said Letters Patent is hereby corrected as shown below:

In claim 7, Column 38, line 22: delete "claim 3" and replace with "claim 1".

In claim 7, Column 38, line 23: delete "resources belong" and replace with "resource belongs".

In claim 7, Column 38, lines 23-24: insert --relevant-- before the term "browsing".

In claim 10, Column 38, line 33: delete the second instance of "other" and replace with "second".

This certificate supersedes the Certificate of Correction issued September 14, 2010.

Signed and Sealed this

Second Day of November, 2010

David J. Kappos
*Director of the United States Patent and Trademark Office*